(12) United States Patent
Billheimer et al.

(10) Patent No.: US 6,611,825 B1
(45) Date of Patent: Aug. 26, 2003

(54) METHOD AND SYSTEM FOR TEXT MINING USING MULTIDIMENSIONAL SUBSPACES

(75) Inventors: D. Dean Billheimer, Seattle, WA (US); Andrew James Booker, Seattle, WA (US); Michelle Keim Condliff, Issaquah, WA (US); Mark Thomas Greaves, Seattle, WA (US); Fredrick Baden Holt, Bellevue, WA (US); Anne Shu-Wan Kao, Bellevue, WA (US); Daniel John Pierce, Woodinville, WA (US); Stephen Robert Poteet, Bellevue, WA (US); Yuan-Jye Wu, Issaquah, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/328,888

(22) Filed: Jun. 9, 1999

(51) Int. Cl.[7] .................................................. G06N 5/00
(52) U.S. Cl. .............................. 706/45; 382/156; 707/1
(58) Field of Search ........................... 706/45; 382/156, 382/190, 195, 115, 225, 275; 704/254, 256; 707/2, 1, 5, 200

(56) References Cited

U.S. PATENT DOCUMENTS

| | | | |
|---|---|---|---|
| 4,839,853 A | | 6/1989 | Deerwester et al. |
| 5,021,976 A | | 6/1991 | Wexelblat et al. |
| 5,295,243 A | | 3/1994 | Robertson et al. |
| 5,301,109 A | | 4/1994 | Landauer et al. |
| 5,317,507 A | | 5/1994 | Gallant |
| 5,325,298 A | | 6/1994 | Gallant |
| 5,506,937 A | | 4/1996 | Ford et al. |
| 5,542,006 A | * | 7/1996 | Shustorovich ............. 382/156 |
| 5,542,090 A | | 7/1996 | Henderson et al. |
| 5,625,767 A | | 4/1997 | Bartell et al. |
| 5,675,710 A | | 10/1997 | Lewis |
| 5,675,819 A | | 10/1997 | Schuetze |
| 5,687,364 A | | 11/1997 | Saund et al. |
| 5,704,005 A | * | 12/1997 | Iwamida .................... 704/254 |
| 5,737,488 A | * | 4/1998 | Iso ............................. 704/256 |
| 5,761,685 A | | 6/1998 | Hutson |
| 5,794,178 A | | 8/1998 | Caid et al. |
| 5,805,742 A | * | 9/1998 | Whitsit ....................... 382/275 |

(List continued on next page.)

OTHER PUBLICATIONS

G. Salton, A. Wong and C.S. Yang, "A Vector Space Model for Automatic Indexing," *Communications of the ACM*, Nov. 1975, vol. 18, No. 11.

Leo Breiman, Jerome H. Friedman, Richard A. Olshen and Charles J. Stone, *Classification and Regression Trees*, Wadsworth International Group 1984.

Gerard Salton and Christopher Buckley, "Term–Weighting Approaches in Automatic Text Retrieval," *Information Processing & Management*, vol. 24, No. 5, pp. 513–523, 1988.

(List continued on next page.)

*Primary Examiner*—Wilbert L. Starks, Jr.
(74) *Attorney, Agent, or Firm*—Christensen O'Connor Johnson Kindness PLLC

(57) ABSTRACT

A text mining program is provided that allows a user to perform text mining operations, such as: information retrieval, term and document visualization, term and document clustering, term and document classification, summarization of individual documents and groups of documents, and document cross-referencing. This is accomplished by representing the text of a document collection using subspace transformations. This subspace transformation representation is performed by: constructing a term frequency matrix of the term frequencies for each of the documents, transforming the term frequencies for statistical purposes, and projecting the documents or the terms into a lower dimensional subspace. As the document collection is updated, the subspace is dynamically updated to reflect the new document collection.

33 Claims, 22 Drawing Sheets

U.S. PATENT DOCUMENTS

| | | | | |
|---|---|---|---|---|
| 5,857,179 | A | | 1/1999 | Vaithyanathan et al. |
| 6,014,633 | A | * | 1/2000 | DeBusk et al. ................. 705/7 |
| 6,122,628 | A | * | 9/2000 | Castelli et al. ................. 707/5 |
| 6,134,541 | A | * | 10/2000 | Castelli et al. ................. 707/2 |
| 6,178,261 | B1 | * | 1/2001 | Williams et al. ............ 382/190 |
| 6,189,002 | B1 | * | 2/2001 | Roitblat ......................... 707/1 |
| 6,307,965 | B1 | * | 10/2001 | Aggarwal et al. .......... 382/225 |
| 6,349,309 | B1 | * | 2/2002 | Aggarwal et al. .......... 707/200 |
| 6,466,685 | B1 | * | 10/2002 | Fukui et al. ................ 382/115 |
| 2002/0032682 | A1 | * | 3/2002 | Kobayashi et al. ............ 707/5 |
| 2002/0122593 | A1 | * | 9/2002 | Kato et al. .................. 382/195 |

OTHER PUBLICATIONS

Scott Deerwester, Susan T. Dumais, George W. Furnas, Thomas K. Landauer and Richard Harshman, "Indexing by Latent Semantic Analysis," *Journal of the American Society for Information Science*, 41(6):391–407, Sep. 1990.

Sixth Message Understanding Conference (MUC–6), Proceedings of a Conference Held in Columbia, Maryland, Nov. 6–8, 1995.

Tom M. Mitchell, *Machine Learning*, WCB/McGraw–Hill, 1997.

Tamara G. Kolda and Dianne P. O'Leary, "A Semi–Discrete Matrix Decomposition for Latent Semantic Indexing in Information Retrieval," *ACM Transactions on Information Systems*, 16(1998) 322–346.

M.E. Maron and J.L. Kuhns, "On Relevance, Probabilistic Indexing and Information Retrieval," *Journal of the Association for Computing Machinery*, 7(3), pp. 216–244 (1960).

* cited by examiner

| | KEYWORD SEARCH + BOOLEAN AND OTHER OPERATORS 30 | PROBABILISTIC MODELS 31 | NATURAL LANGUAGE UNDERSTANDING 32 | TRADITIONAL VECTOR SPACE MODELS 33 | TRADITIONAL LATENT SEMANTIC INDEXING 34 | THIS INVENTION 35 |
|---|---|---|---|---|---|---|
| ADDRESS ALL TEXT MINING OPERATIONS? 40 | NO | NO | NO | NOT VERY WELL | YES | YES |
| ABLE TO HANDLE LARGE SET OF DATA? 41 | YES | YES | DIFFICULT | YES (BUT HAVE TO PRE-SELECT A SET OF TERMS OF INTEREST) | YES | YES |
| REASONABLY FAST PROCESSING SPEED? 42 | YES | YES | NO | YES | YES | YES |
| PRIOR KNOWLEDGE OF DATA REQUIRED? 43 | NO | YES | YES (VERY EXTENSIVE KNOWLEDGE IS REQUIRED) | YES (IN ORDER TO PRE-SELECT TERMS) | NO | NO |
| PROVIDE SEMANTIC INTERPRETATION? 44 | YES | YES | YES (BUT COMPLICATED) | YES | NO | YES |
| SUPPORT VISUAL EXPLORATION BY USER? 45 | NO | NO | NO | NO | NO | YES |

*Fig. 1.*

| | DOCUMENT A | DOCUMENT B | DOCUMENT C | DOCUMENT D | DOCUMENT E | DOCUMENT F | QUERY VECTOR ($q_0$) |
|---|---|---|---|---|---|---|---|
| APACHE | 15 | 0 | 10 | 0 | 12 | 0 | 1 |
| AH-64 | 0 | 10 | 20 | 0 | 11 | 0 | 0 |
| EAGLE | 0 | 0 | 0 | 15 | 0 | 12 | 0 |
| ROTORCRAFT | 25 | 22 | 10 | 0 | 15 | 0 | 0 |
| F15 | 0 | 0 | 0 | 12 | 0 | 9 | 0 |
| | 15 | 0 | 10 | 0 | 12 | 0 | = SCORE $q_0^T A_0$ |

*Fig. 15.*

| | DOCUMENT A | DOCUMENT B | DOCUMENT C | DOCUMENT D | DOCUMENT E | DOCUMENT F | QUERY VECTOR |
|---|---|---|---|---|---|---|---|
| APACHE | .375 | 0 | .250 | 0 | .316 | 0 | 1 |
| AH-64 | 0 | .313 | .500 | 0 | .290 | 0 | 0 |
| EAGLE | 0 | 0 | 0 | .556 | 0 | .571 | 0 |
| ROTORCRAFT | .625 | .688 | .250 | 0 | .395 | 0 | 0 |
| F15 | 0 | 0 | 0 | .444 | 0 | .429 | 0 |
| | .375 | 0 | .250 | 0 | .316 | 0 | = SCORE |

*Fig. 16.*

|   | DOCUMENT A | DOCUMENT B | DOCUMENT C | DOCUMENT D | DOCUMENT E | DOCUMENT F | QUERY VECTOR |
|---|---|---|---|---|---|---|---|
| APACHE | .218 | -.157 | .093 | -.157 | .159 | -.157 | .843 |
| AH-64 | -.184 | .129 | .316 | -.184 | .106 | -.184 | -.184 |
| EAGLE | -.188 | -.188 | -.188 | .368 | -.188 | .384 | -.188 |
| ROTORCRAFT | .300 | .361 | -.076 | -.326 | .069 | -.326 | -.326 |
| F15 | -.146 | -.146 | -.146 | .300 | -.146 | .283 | -.146 |
|   | .177 | -.217 | .102 | -.105 | .149 | -.105 | = SCORE |

*Fig. 17*

|  | DOCUMENT A | DOCUMENT B | DOCUMENT C | DOCUMENT D | DOCUMENT E | DOCUMENT F | QUERY $q$ |
|---|---|---|---|---|---|---|---|
| APACHE | 0.1371 | 0.0934 | 0.0053 | -0.1472 | 0.0591 | -0.1477 | .843 |
| AH-64 | -0.1696 | 0.0855 | 0.3315 | -0.1848 | 0.1231 | -0.1857 | -.184 |
| EAGLE | -0.1770 | -0.2213 | -0.1761 | 0.3738 | -0.1745 | 0.3751 | -.188 |
| ROTORCRAFT | 0.3466 | 0.2138 | -0.0244 | -0.3312 | 0.1274 | -0.3322 | -.326 |
| F15 | -0.1371 | -0.1714 | -0.1364 | 0.2895 | -0.1351 | 0.2905 | -.146 |
|  | 0.0869 | 0.0599 | 0.0044 | -0.0945 | 0.0381 | -0.0948 | = SCORE $q^T A_2$ |

*Fig. 18.*

METHOD AND SYSTEM FOR TEXT MINING USING MULTIDIMENSIONAL SUBSPACES

FIELD OF THE INVENTION

The invention relates generally to text mining, and more specifically to using multidimensional subspaces to represent semantic relationships that exist in a set of documents.

BACKGROUND OF THE INVENTION

Text mining is an extension of the general notion of data mining in the area of free or semi-structured text. Data mining broadly seeks to expose patterns and trends in data, and most data mining techniques are sophisticated methods for analyzing relationships among highly formatted data, i.e., numerical data or data with a relatively small fixed number of possible values. However, much of the knowledge associated with an enterprise consists of textually-expressed information, including free text fields in databases, reports and other documents generated in the company, memos, e-mail, Web sites, and external news articles used by managers, market analysts, and researchers. This data is inaccessible to traditional data mining techniques, because these techniques cannot handle the unstructured or semi-structured nature of free text. Similarly, the analysis task is beyond the capabilities of traditional document management systems and databases. Text mining is a developing field devoted to helping knowledge workers find relationships between individual unstructured or semi-structured text documents and semantic patterns across large collections of such documents.

Research in text mining has its roots in information retrieval. Initial information retrieval work began around 1960, when researchers started to systematically explore methods to match users queries to documents in a database. However, recent advances in computer storage capacity and processing power coupled with massive increases in the amount of text available on-line have resulted in a new emphasis on applying techniques learned from information retrieval to a wider range of text mining problems. Concurrently, text mining has grown from its origins in simple information retrieval systems to encompass additional operations including: information visualization; document classification and clustering; routing and filtering; document summarization; and document cross-referencing. All of the text mining operations listed above share the common need to automatically assess and characterize the similarity between two or more pieces of text. This need is most obvious in information retrieval.

All information retrieval methods depend upon the twin concepts of document and term. A document refers to any body of free or semi-structured text that a user is interested in getting information about in his or her text mining application. This text can be the entire content of a physical or electronic document, an abstract, a paragraph, or even a title. The notion of a document also encompasses text generated from images and graphics or text recovered from audio and video objects. Ideally, a document describes a coherent topic. All documents are represented as collections of terms, and individual terms can appear in multiple documents. Typically, a term is a single word that is used in the text. However, a term can also refer to several words that are commonly used together, for example, "landing gear." In addition, the terms that represent a piece of text may not appear explicitly in the text; a document's terms may be obtained by applying acronym and abbreviation expansion, word stemming, spelling normalization, thesaurus-based substitutions, or many other techniques. Obtaining the best set of terms for a given document is dependent upon the document or the collection to which the document belongs and the particular goal of the text mining activity.

Once a suitable set of documents and terms have been defined for a text collection, various information retrieval techniques can be applied to the collection. These techniques can be grouped into four broad categories: keyword search methods, natural language understanding methods, probabilistic methods, and vector space methods. Each of these categories is discussed below.

Keyword search methods are currently the most basic and widely used technique in commercial information retrieval systems. The simplest keyword search method retrieves all documents that contain the exact words that are present in the user's query. More advanced keyword search methods trade this cognitive simplicity for more powerful query specification languages, including the ability to specify Boolean operators, proximity operators, fuzzy matching operators, synonym lists, phonetic spellouts, and other term equivalence classes. The advantage of keyword search methods is that they are efficient to implement, very effective for a certain class of queries, and cognitively straightforward. However, keyword search methods have several disadvantages. First, because the technique relies solely on the matching of words, performance is highly dependent on the exact formulation of the query. Second, keyword search methods furnish only crude ways to determine the relevance of a document to the query. The most relevant document may be at the bottom of an enormous list. Third, keyword searching has problems due to the highly ambiguous nature of natural language. Relative to an ideal query response, keyword-based information retrieval systems can both overgenerate and undergenerate. Overgeneration occurs if the query terms have multiple meanings in the document set. Undergeneration occurs if relevant documents in the set happen to use synonyms for the query terms. Finally, keyword searching has limited applicability in general text mining. Keyword searching methods are typically effective only for information retrieval applications, and either do not address or only crudely apply to many of the other text mining operations listed above.

Natural language understanding methods are knowledge-intensive techniques that attempt to parse each sentence in the document collection and generate a semantic interpretation. The individual sentential interpretations can then be composed to yield highly detailed semantic characterizations of documents that can be used to support further text mining operations. Natural language understanding techniques typically require several types of detailed knowledge bases: lexical (information about the grammatical classes and meanings of individual words); syntactic (information about the grammar of expressions); semantic (information about how the expressions refer to the world); and pragmatic (information about the likely intentions and goals of the document author). Given sufficient knowledge bases, the natural language understanding approach to text mining can potentially find levels of detail that cannot be found by other methods. However, the difficulty of constructing and maintaining the required knowledge bases is a major drawback of this method. Knowledge bases of sufficient detail typically require a great deal of time and prior knowledge about the document collection and must be continually updated and checked for consistency. Further, the information in these knowledge bases ranges from fairly general world knowledge to completely domain specific facts and expert knowledge, and can easily involve probabilities, uncertainties, contradictions, and other difficult issues. In addition, even when provided with sufficient knowledge bases, natural language understanding algorithms are extremely slow compared to other text mining approaches. Therefore, natural language understanding methods are typically best suited for text mining applications requiring very detailed information from a specified document or small number of documents, and are not well suited for the analysis of large document collections.

The overall goal of probabilistic information retrieval methods is to estimate the probability that a document is relevant to a query, and to use this estimate to construct a relevance-ranked list of query matches. Probabilistic methods differ in how they model the relationship between documents and queries. The most frequently discussed probabilistic model is the binary independence model, although it is rarely used in practice. Difficulties in parameter estimation due to lack of training data plague most probabilistic methods, including those based on the binary independence model. Recently, Bayesian probabilistic models have been proposed that can overcome this difficulty while retaining the advantage of a solid theoretical grounding. Rather than requiring a single point of estimation for each of the model parameters, Bayesian models allow the system designer to specify prior distributions for these parameters. According to Bayesian statistical theory, these distributions should embody any prior knowledge known about these quantities, and can incorporate knowledge about other queries, terms in the query, and term frequency and distribution in the document set. Further, as the system operates and more knowledge is gained, the parameter distributions can be systematically updated and revised to obtain posterior distributions. In this way, probabilistic information retrieval methods based on Bayesian models can naturally incorporate relevance feedback data. The primary advantage of probabilistic methods for text mining is that they are grounded in statistical theory, and Bayesian probabilistic models in particular, are promising for certain information retrieval tasks. However, because these methods generally focus only on the information retrieval, routing and filtering, and classification aspects of text mining, they have somewhat limited applicability to other text mining operations, such as visualization.

Traditional vector space models treat individual documents as vectors in a high-dimensional vector space in which each dimension corresponds to some feature of a document. A collection of documents can therefore be represented by a two-dimensional matrix $A_{f,d}$ of features and documents. In the typical case, the features correspond to document terms, and the value of each feature is the frequency of that term in the specified document. For example, if term $t_1$ occurs four times in document $d_1$, then $A_{(1,1)}$ is set to 4. Similarly, if term $t_2$ does not occur in $d_1$, then $A_{(2,1)}$ is set to 0. More complex types of vector space methods, such as latent semantic indexing (LSI), involve different methods to compute the elements in A, e.g. singular value decomposition (SVD) or semi-discrete decomposition (SDD), typically attempting to provide a more sophisticated set of features and a better measure of the importance of each feature in a document.

By representing documents as vectors in a feature space, similarity between documents can be evaluated by computing the distance between the vectors representing the documents. The cosine measure is commonly used for this purpose, but other distance measures can be used. To use the vector space model as a method for information retrieval, a user's query is represented as a vector in the same space as the document vectors. The distance between the query vector and each of the document vectors is computed, and the documents that are closest to the query are retrieved.

The advantages of the vector space method are that it provides a simple and uniform representation of documents and queries, can accommodate many variations appropriate to different document collections, and it has been shown to perform well in information retrieval applications. In addition, representing documents as vectors could be useful for all other text mining operations. However, the performance of the basic vector space model is severely limited by the size of A. In actual document collections, both the number of documents and the number of terms are typically quite large, resulting in a large A, and making the necessary distance calculations prohibitively slow. It is possible to alleviate this problem by preselecting a subset of all possible terms to use in the matrix, but this can degrade information retrieval performance and limits text mining capability. Finally, while the vector space model provides a way of assessing the similarities between pieces of text, it alone does not provide a good way to visualize these relationships or summarize documents.

Accordingly, there exists a need in the art of text mining for a method that addresses all text mining operations in a reasonably fast manner over a large data set without requiring prior knowledge of the data. The method should be easily extensible to changing document collections. Additionally, the method should provide a mechanism for labeling the data with meaningful terms that characterize the semantic dimensions of the document collection, as well as supporting visual exploration of the data.

SUMMARY OF THE INVENTION

The present invention is directed to a method, a system, and computer readable medium for representing a document collection using a subspace projection based on the distribution of the occurrence of terms in the documents of the document collection by: constructing a term frequency matrix; statistically transforming the term frequencies in the term frequency matrix using a two-sided orthogonal decomposition and identifying the significant features to determine a term subspace and a document subspace; and performing a projection into a lower dimensional subspace. The projection can either be a projection of documents into the term subspace or a projection of terms terms into the document subspace.

In accordance with other aspects of the invention, the term frequency matrix is constructed by defining the term frequency matrix with each row representing a term occurring in one or more of the documents in the document collection, and each column representing one of the documents in the document collection. Each entry in the term frequency matrix represents the number of occurrences of the term for the document.

In accordance with yet other aspects of the invention, the terms used in the term frequency matrix are determined by a tokenizing policy that tokenizes the document and removes stopwords from the list of tokens. Additional steps can optionally be performed including: removing low frequency words, acronym expansion, abbreviation expansion, other term normalization, and stemming.

In accordance with further aspects of the invention, when the document collection is a dynamically changing document collection, the subspace is updated as the document collection changes. The subspace is updated by identifying the new documents and new terms in the new documents, constructing a new term frequency matrix, statistically transforming the term frequencies in the same way that the initial document collection was transformed, projecting the term frequency matrix on the term subspace, computing the residual, augmenting the term subspace with the normalized residual, expanding the document subspace, and re-identifying significant features in the subspace.

In accordance with yet further aspects of the invention, identifying the new terms in the documents of an updated collection uses the same policies to determine the terms as was used for determining the terms of the initial document collection. This includes tokenizing the document, removing stopwords, removing low frequency words, performing acronym expansion, performing abbreviation expansion, performing other term normalization, and performing stemming according to the policies used during the determination of the initial document collection.

In accordance with still further aspects of the invention, statistically transforming term frequencies includes: determining a document length; determining a relative term frequency for the occurrence by adjusting the raw frequency of occurrence of each term by the document length; performing an operation on the relative term frequencies to make high frequency and low frequency terms more comparable; as an optional step, centering the data around the origin by subtracting the row average from each term frequency.

In accordance with yet other aspects of the invention, projecting the documents or terms into a lower dimension subspace is accomplished by determining the number of dimensions to use; performing a truncated two-sided orthogonal decomposition of the term frequency matrix according to the determined number of dimensions; and projecting the documents or terms into the lower dimensional subspace. Preferably, the truncated two-sided orthogonal decomposition is a truncated URV decomposition.

In accordance with still other aspects of this invention, verbal semantics for a dimension, i.e., words or terms describing the meaning of that dimension, can be provided by: identifying the column in the term frequency that corresponds to the dimension;, identifying terms in the column with the largest absolute values for both positive and negative entries; returning the largest positive and negative entries as a contrast set describing the meaning of the position along the dimension.

In accordance with further aspects of the invention, document summarization can be performed for an individual document, i.e., a few words or terms summarizing the contents of a document or indicating its topical affiliations, can be provided by: projecting the document into a subspace; projecting the document projection back into a term space; identifying a plurality of terms with the largest entries; and returning the identified terms as the document summarization.

In accordance with yet further aspects of the invention, document summarization can be performed for a group of documents, i.e., a few words or terms summarizing the contents of the group of documents, can be provided by: projecting the group of documents into a subspace; finding the centroid of the group of documents in the subspace; projecting the centroid back into a term space; identifying terms with the largest entries; and returning the identified terms as a summarization of the group of documents.

In accordance with yet further aspects of the invention, information visualization can be performed. Information visualization is performed in response to a user requesting information visualization. Information visualization is performed by computing the requested dimensions, determining default dimensions if the user has requested fewer than three dimensions (or whatever number of dimensions are being used for visualization), ensuring that the dimensions are orthogonalized if the user so desires, projecting documents onto the resulting dimensions, generating legends for the dimensions, and displaying the documents on labeled axes corresponding to the dimensions.

In accordance with yet further aspects of the invention, information retrieval can be performed upon user request. Information retrieval is performed by constructing a term frequency query vector, statistically transforming the term frequencies in the same way that the terms in the original document collection were transformed, projecting the vector into the subspace, determining similarity by measuring the distance between the query and the documents, and returning ranked matching documents. The term frequency vector is constructed by tokenizing using the same policy as was used for the original document collection, performing any optional functions using the same policy as was used for the original document collection, and identifying the terms in the original term frequency matrix representing the original document collection.

In accordance with still other aspects of the invention, document cross-referencing can be performed by segmenting the documents of the document collection into a plurality of suitably sized units, constructing a subspace representation for the units from all or a subset of the documents, projecting all the units into that subspace, determining similarity by measuring the distance between the projections of the units from one or more documents and the projections of the units in one or more target documents, and returning ranked matching units as potential cross-reference sections.

In accordance with still other aspects of the present invention, other text mining operations, including document clustering, term clustering, term classification, and document classification, can be performed by using the subspace projections of documents or terms as the input to a variety of clustering or classification algorithms.

BRIEF DESCRIPTION OF THE DRAWINGS

The foregoing aspects and many of the attendant advantages of the invention will become more readily appreciated as the same becomes better understood by reference to the following detailed description, when taken in conjunction with the accompanying drawings, wherein:

FIG. 1 is a chart comparing the various text mining methods;

FIG. 15 illustrates an example of the raw number of occurrences of a plurality of terms in a document collection;

FIG. 16 illustrates the document collection of FIG. 15 after performing proportioning;

FIG. 17 illustrates the document collection of FIG. 15 after performing centering;

FIG. 18 illustrates the document collection of FIG. 15 after projection into a subspace performed in accordance with the present invention;

DETAILED DESCRIPTION OF THE PREFERRED EMBODIMENTS

Figure 2:
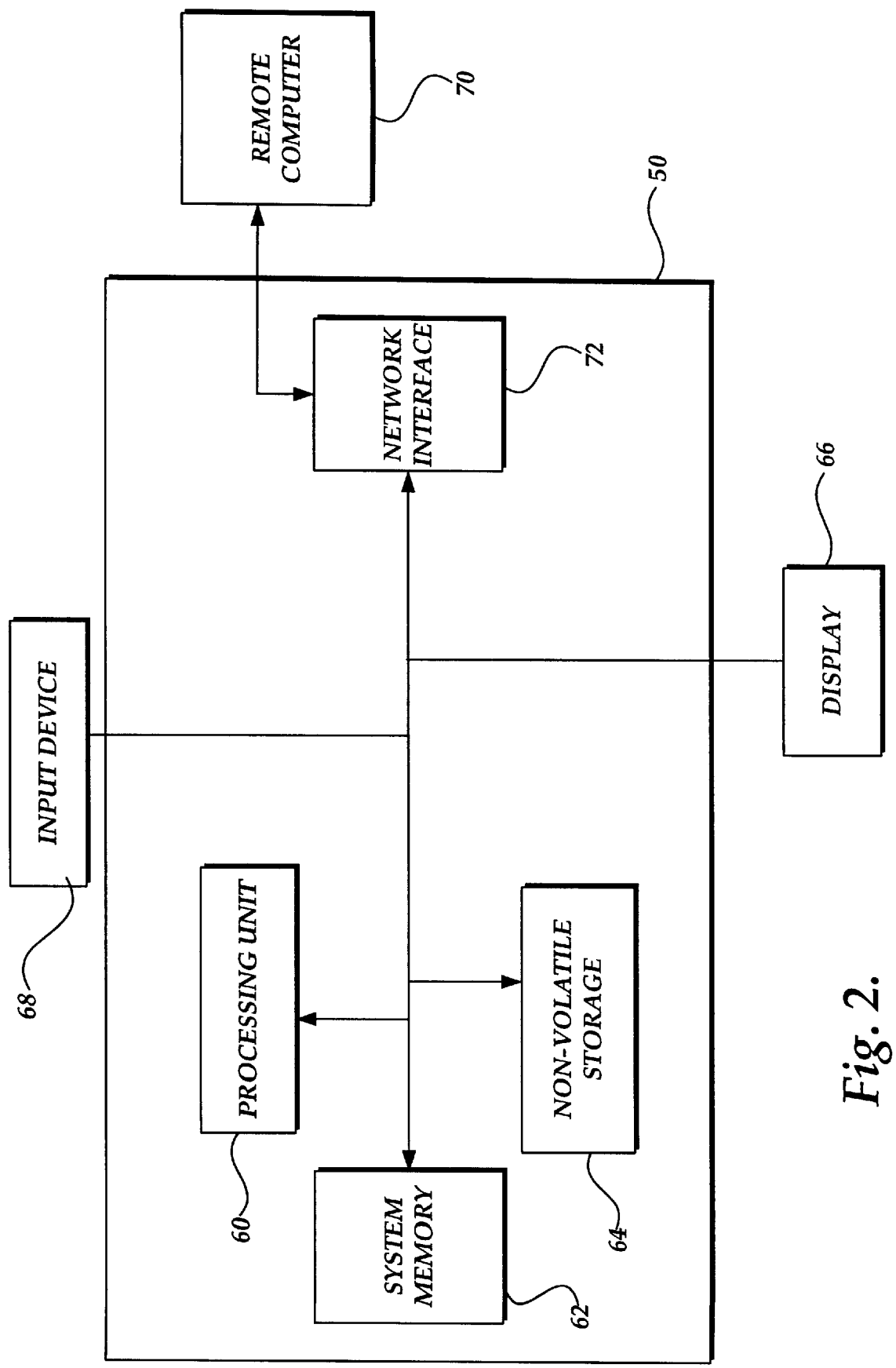
FIG. 2 is a block diagram of a general purpose computer system suitable for implementing the present invention.

The present invention is directed to a computer program for performing text mining operations. The invention uses a multidimensional subspace to represent the semantic relationships that exist in a set of documents. The method employs a truncated two-sided orthogonal decomposition (e.g., URV or ULV) to compute the desired subspace out of a larger vector space. The derived subspace can be used as a foundation for a variety of common text mining operations including: term and document visualization (including providing alternative frames of reference for analysis and user exploration), term and document clustering, term and document classification, summarization of individual documents and groups of documents, document cross-referencing, and information retrieval.

FIG. 1 is a chart comparing the present invention to other methods of text mining. Each column in the chart represents one of the text mining methods indicated across the top of the chart including: keyword searching including Boolean and other operators 30; probabilistic models 31; natural language understanding 32; traditional vector space models 33; traditional latent semantic indexing (i.e., latent semantic indexing using SVD) 34; and the present invention 35. Each text mining method is evaluated based on a number of characteristics, with each row in the chart representing one of these characteristics. The characteristics are labeled along the left side of the chart, and include: the ability to address all text mining operations 40; the ability to handle large sets of data 41; a reasonably fast processing speed 42; whether prior knowledge of data is required 43; whether semantic interpretation is provided 44; and whether visual exploration by the user is supported 45. While each of the methods besides the present invention contains positive responses for one or more of the evaluated characteristics, only the present invention contains positive responses for all of the evaluated characteristics.

As can be seen in FIG. 1, and as discussed in the background section, keyword searching 30 can handle a large set of data 41 with a reasonably fast speed 42 without requiring previous knowledge of the data 43. Keyword searching can also provide semantic interpretation 44. However, keyword searching does not address all text mining operations 40 and does not support visual exploration 45 because it does not support visualization at all.

Probabilistic models 31 can also handle a large data set 41 with a reasonably fast processing speed 42, however, prior knowledge of the data is required 43. Probabilistic models can provide semantic interpretation 44, but they do not address all text mining operations 40, nor do they support visual exploration 45.

Natural language understanding methods 32 can provide semantic interpretation, but it is complicated 44. It is difficult to process a large data set 41 with natural language understanding. Additionally, natural language understanding methods are slow 42 and require extensive knowledge of the data 43. Furthermore, natural language understanding does not address all text mining operations 40 and does not support visual exploration 45.

Traditional vector space models 33 can process data with a reasonably fast processing speed 42. They can handle a large set of data, but terms of interest must be pre-selected 41. Since terms of interest must be pre-selected, prior knowledge of the data is required 43. Vector space models can provide semantic interpretation 44. They attempt to address all text mining operations, but do not adequately do so 40. Traditional vector space models do not support visual exploration 45.

Traditional latent semantic indexing 34 handles a large set of data 41 in a reasonably fast processing time 42 without requiring prior knowledge of the data 43. Traditional latent semantic indexing also addresses all text mining operations 40. However, traditional latent semantic indexing does not provide semantic interpretation 44, nor does it support visual exploration 45.

The present invention 35 is able to process a large data set 41 in a reasonably fast processing time 42 without requiring prior knowledge about the data 43. Additionally, unlike any of the other methods, the present invention also provides semantic interpretation 44, addresses all text mining operations 40 and supports visual exploration 45.

FIG. 2 depicts several of the key components of a general purpose computer 50 on which the present invention may be implemented. Those of ordinary skill in the art will appreciate that a computer includes many more components than those shown in FIG. 2. However, it is not necessary that all of these generally conventional components be shown in order to disclose an illustrative embodiment for practicing the invention. The computer 50 includes a processing unit 60 and a system memory 62 which includes random access memory (RAM) and read-only memory (ROM). The computer also includes non-volatile storage 64, such as a hard disk drive, where data is stored. The present invention also includes one or more input devices 68, such as a mouse, keyboard, etc. A display 66 is provided for viewing text mining data and interacting with a user interface to request text mining operations. The present invention may be connected to one or more remote computers 70 via a network interface 72. The connection may be over a local area network (LAN) or wide area network (WAN), and includes all of the necessary circuitry for such a connection. In one embodiment of the present invention, the document collection includes documents on an intranet. Other embodiments are possible, including: a local document collection, i.e., all documents on one computer, documents stored on a server and/or a client in a network environment, etc.

Figure 20:
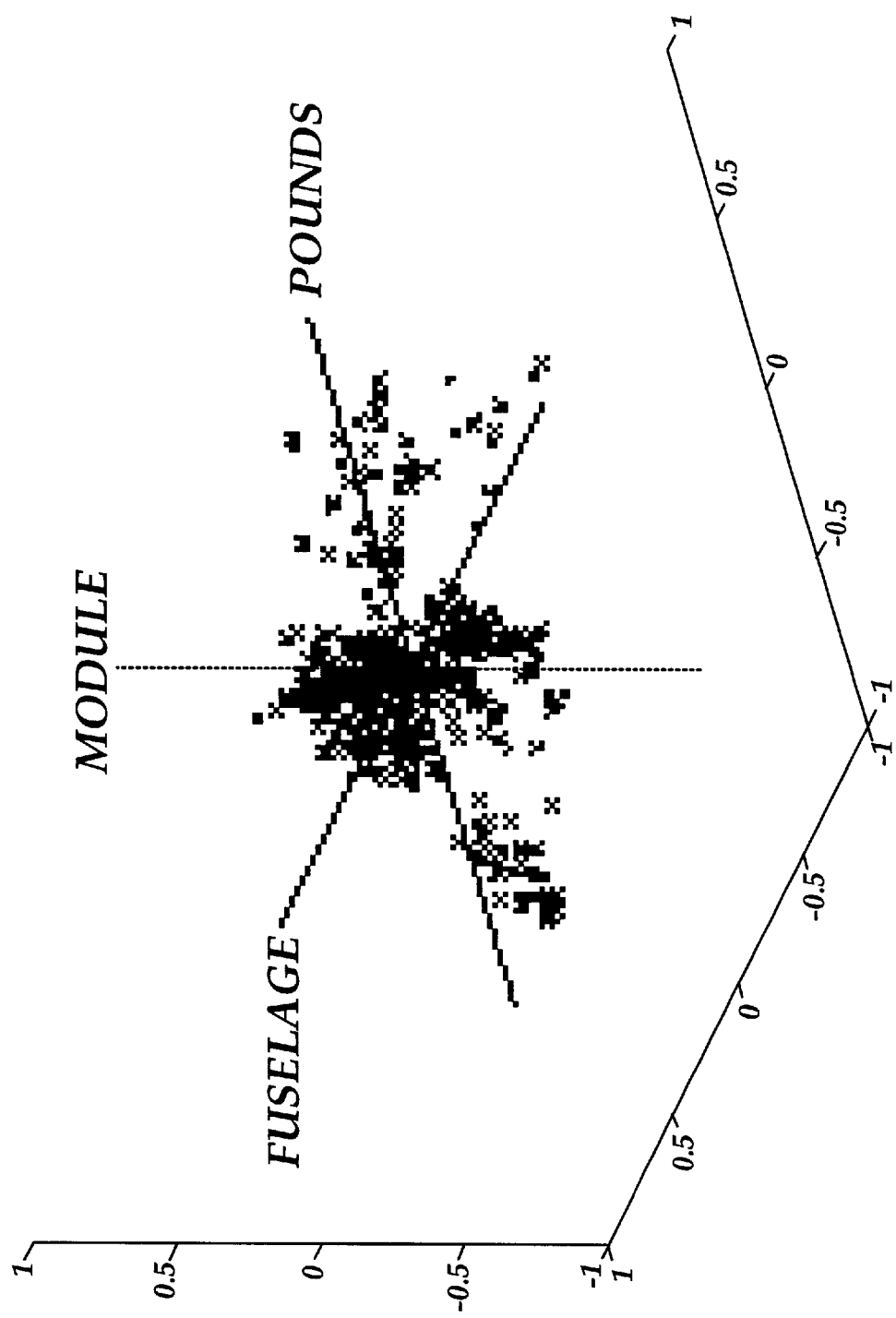
FIG. 20 is an example of visualization performed in accordance with the present invention.
Figure 21:
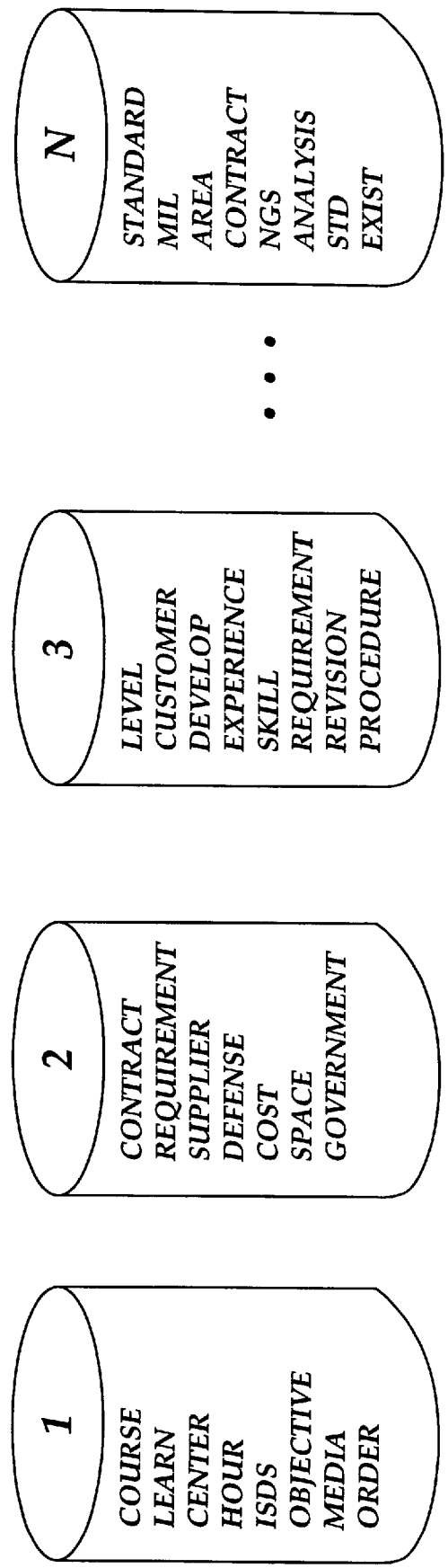
FIG. 21 illustrates an example of document clustering and document cluster summarization performed in accordance with the present invention.

FIGS. 3–14 are flow diagrams illustrating the logic of performing text mining operations on a document collection performed in accordance with the present invention. FIGS. 15–19 are drawings illustrating the mathematical underpinnings of the invention. FIGS. 20–21 are drawings illustrating specific text mining operations. These figures will be discussed in combination with the flow diagrams in order to add clarity to the flow diagrams.

Figure 3:
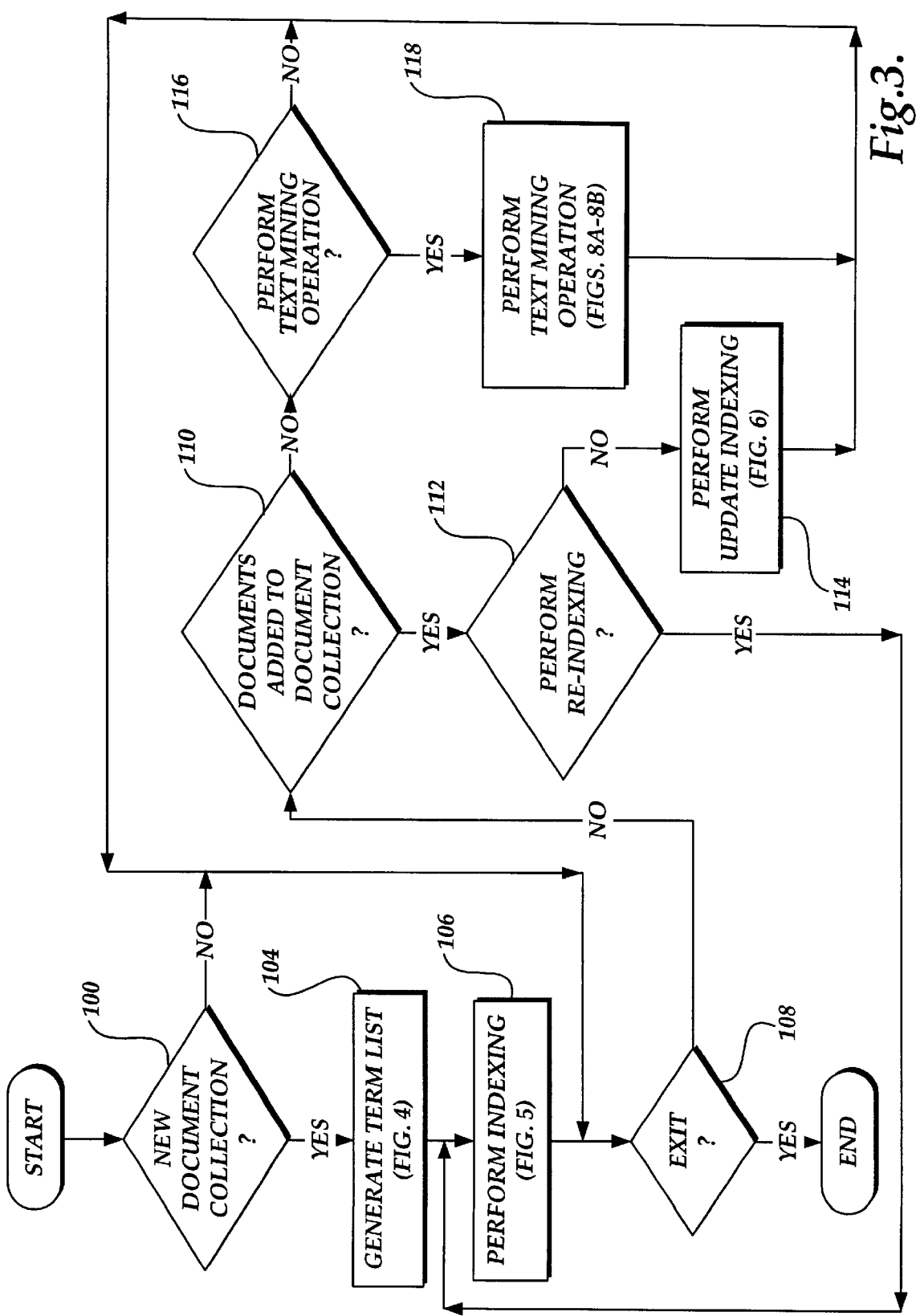
FIG. 3 is a flow diagram illustrating the overall logic of a text mining program formed in accordance with the present invention.

FIG. 3 is a flow diagram illustrating the overall logic of the present invention. The logic moves from a start block to decision block 100 where a test is made to determine if the document collection of interest is new. If so, the logic moves to block 104 where a term list is generated from the initial document collection. Generating a term list from the initial document collection is illustrated in detail in FIG. 4, and is described later. Next, in block 106 initial indexing is performed, as illustrated in detail in FIG. 5, and described later. After initial indexing is performed, or if the document collection is not new, the logic moves to decision block 108 where a test is made to determine if the program should exit. If so, the logic of the present invention ends.

If the program should not exit, the logic moves from decision block 108 to decision block 110 where a test is made to determine if documents have been added to the collection. If so, the logic moves to decision block 112 where a test is made to determine if re-indexing should be performed. Update indexing modifies the subspace to approximate the effects of the new documents. Over time, the approximation of update indexing will gradually lose accuracy, and re-indexing should be performed to re-establish the latent semantic structure of the modified document collection. Preferably, the determination of when to perform re-indexing is made by a user. Preferably, the user has been provided with data that allows him or her to track the growing error in approximation. The user can then perform re-indexing to renew the subspace at a convenient time, such as overnight. If it is determined that re-indexing should be performed, the logic moves from decision block 112 to block 106 where indexing is performed as described later with reference to FIG. 5. The re-indexing logic is the same as the initial indexing logic. If re-indexing should not be performed, the logic moves to block 114 where update indexing is performed. The logic of performing update indexing is illustrated in detail in FIG. 6 and described later. After performing re-indexing 106 or update indexing 114, the logic moves to decision block 108 to determine if the program should exit.

If in decision block 110 it is determined that there were not any documents added to the document collection, the logic moves to decision block 116 where a test is made to determine if a text mining operation should be performed. Preferably, this determination is based on a user request to perform a text mining operation. If so, the logic moves to block 118 for performance of a text mining operation. The logic of performing a text mining operation is illustrated in detail in FIGS. 8A and 8B and described later. After the performance of the text mining operation 118, the logic moves to decision block 108 to determine if the program should exit. If so, the logic ends. If not, the logic moves to decision block 110, and the logic of blocks 108 through 118 is repeated until it is time to exit. It will be appreciated by those skilled in the computer arts that the logic performed in FIG. 3 can be performed in a different order. Preferably, some steps can be performed simultaneously. For example, several text mining operations 118 can be performed in parallel.

Figure 4:
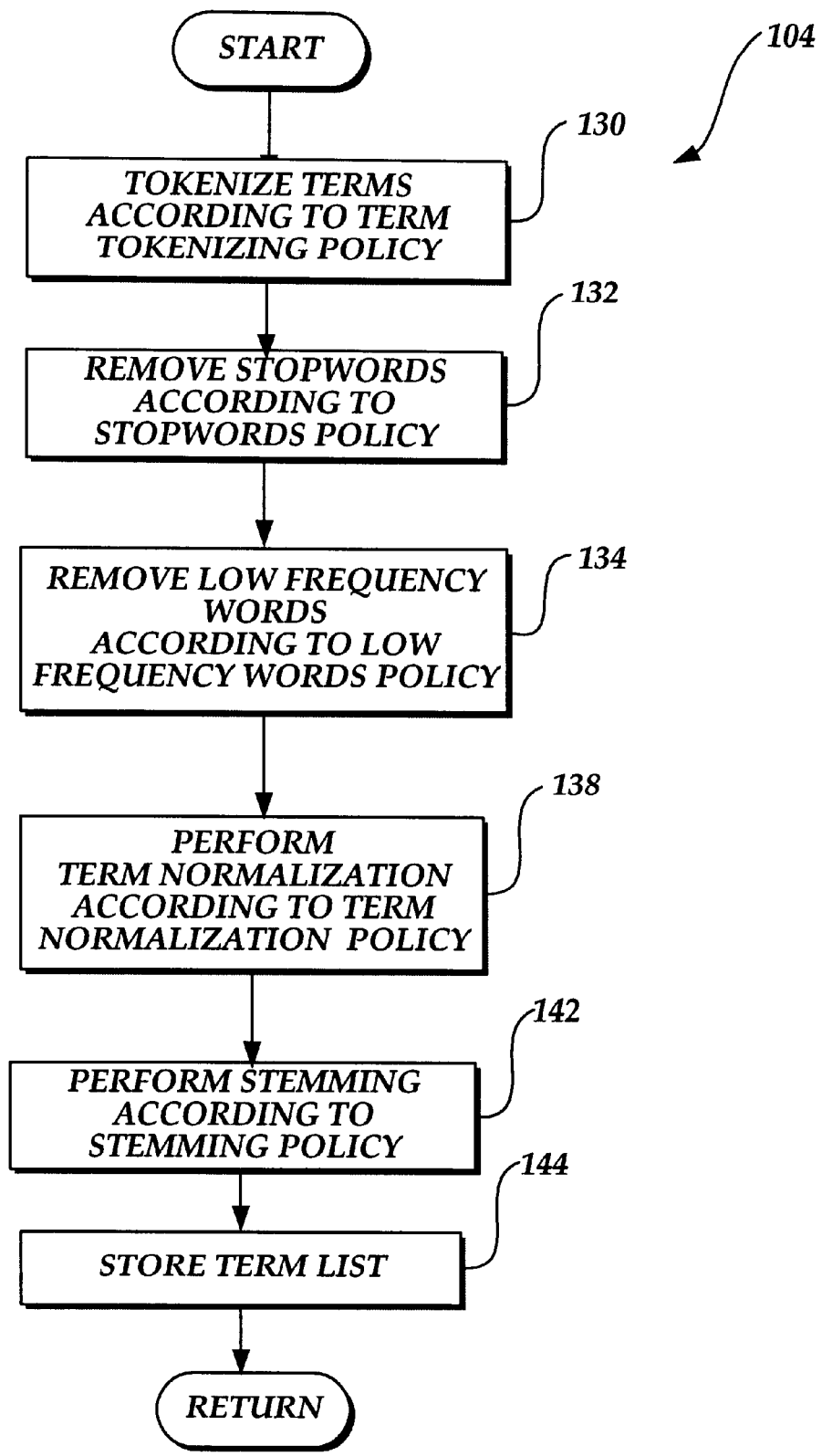
FIG. 4 is a flow diagram illustrating logic for generating a term list.

FIG. 4 illustrates in detail the logic of generating a term list. The logic of FIG. 4 moves from a start block to block 130 where terms are tokenized according to a tokenizing policy, (e.g., sequences of letters, letters and numbers, or letters, numbers and certain punctuation like hyphens or slashes, whatever is needed to capture the important terms in the particular domain or the application). Next, in block 132 stopwords are removed according to a stopwords policy. Stopwords are either terms that do not contribute significantly to the overall topic of the documents, such as conjunctions, articles, pronouns, prepositions, or terms that are frequently used throughout the document, and thus do not serve to topically distinguish one document from another. The optimal set of stopwords (i.e., the stopwords policy) for a document collection is typically specific to that document collection. Low frequency words, i.e., words occurring relatively few times in the document collection, are removed according to a low frequency words policy. See block 134. The low frequency words policy is based on the document collection. This policy may be not to remove low frequency words, thereby making this an optional step. As many as half of the terms in a typical data collection occur less than five times. Eliminating these low frequency terms from A is an optional step that can greatly increase computational speeds with a minor loss of information in the subspace. The logic then moves to block 138 where term normalization is performed according to a term normalization policy. The term normalization policy is based on the document collection. This policy may be not to perform any term normalization, thereby making this an optional step. Term normalization may include: acronym expansion (e.g., "COTS" is the same as "commercial off-the-shelf"), abbreviation expansion (e.g., "ref." is the same as "reference" in some document collections), and other term normalization. Other term normalization is specific to the document collection, for example, in a document collection pertaining to different commercial aircraft models, it might be desirable to group model numbers together, e.g., "747" and "737." The term normalization can include any combination of term normalization, including but not limited to those previously listed. Some of the term normalizations may be performed more than one time. The term normalization policy defines the term normalizations and their order of performance for a given document collection. In block 142, stemming is performed according to a stemming policy. The stemming policy is based on the document collection. This policy may be not to perform stemming, thereby making this an optional step. Stemming eliminates conjugate forms of a word, e.g., "es," "ed," and "ing" and keeps only the root word. Care needs to be taken when performing stemming, for example, it would not be desirable to change "graphics" to "graph" or "Boeing" to "Boe." Finally, in block 144 the term list is stored. When a document collection changes, and update indexing or re-indexing is performed, the same policies originally used to generate the term list, i.e., the same term tokenizing policy 130, the same stopwords policy 132, the same low frequency words policy 134, the same term normalization policy 138, and the same stemming policy 142, are used to update the term list. The logic of FIG. 4 then ends and processing is returned to FIG. 3.

Figure 5:
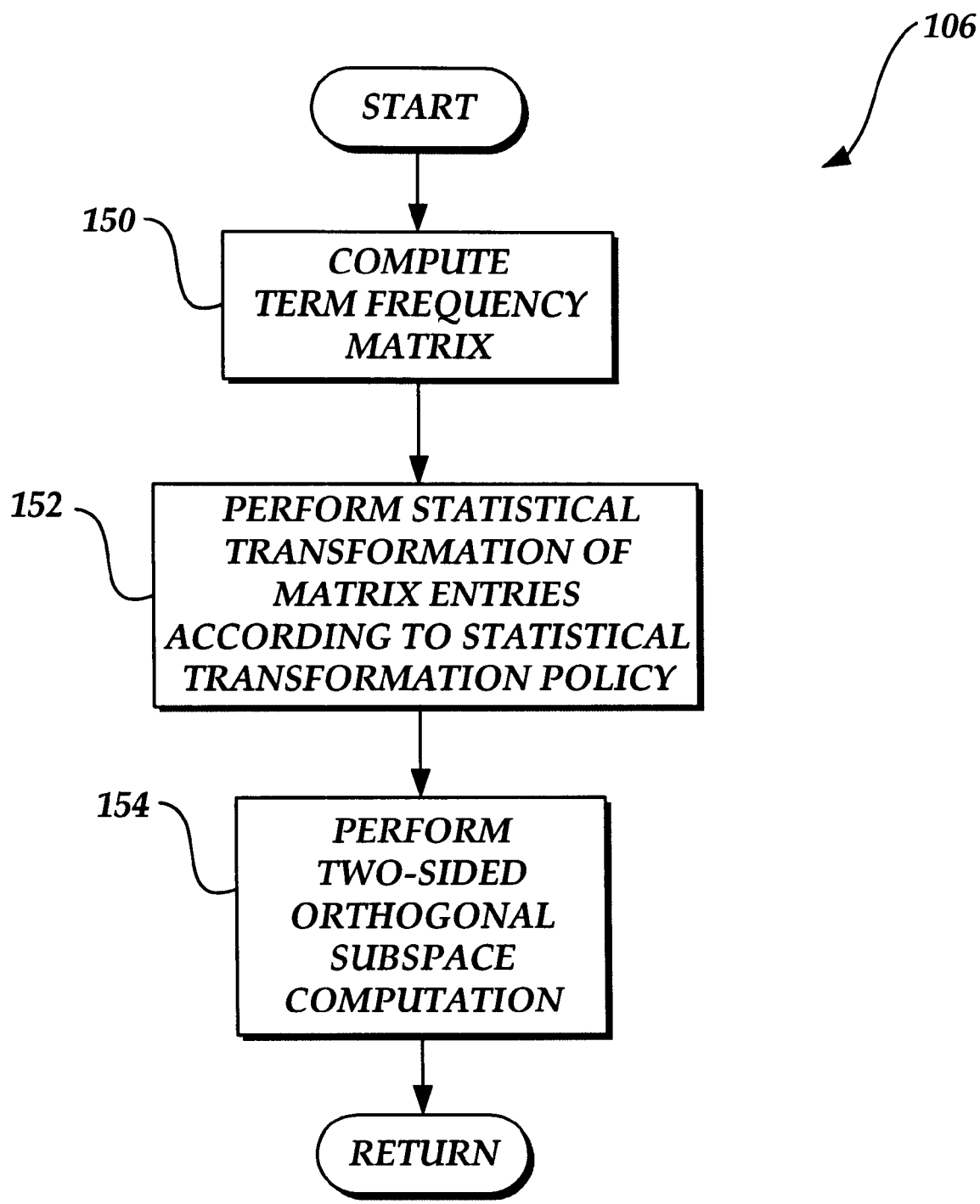
FIG. 5 is a flow diagram illustrating logic for performing indexing.

FIG. 5 is a flow diagram illustrating the logic of performing indexing. Indexing is performed on the initial document collection, as well as when it is determined that re-indexing should occur (see FIG. 3). The logic of FIG. 5 moves from a start block to block 150 where a term frequency matrix is computed. The term frequency matrix A is defined from a set of documents D that have been derived from a free or semi-structured text collection. Across this document collection, statistics are accumulated on the frequency of occurrence of each term. Each entry in A is the raw frequency of the term in the given document, i.e., $A_{i,j}$ is the number of times term $t_i$ occurs in $D_j$. A is typically quite sparse. For an example, see FIG. 15.

In the example illustrated in FIG. 15, sixteen of the thirty entries are zero. There is one entry for each of the five terms considered for each of the six documents in the document collection, for a total of thirty entries. Of these thirty entries, the majority of the entries are zero, i.e., the term does not appear in the document. In reality, term frequency matrices are even more sparse than the example illustrated in FIG. 15. For example, it is common to find term frequency matrices with over 98% of the entries being zero.

Returning to FIG. 5, the logic next moves to block 152 where statistical transformations of matrix entries are performed according to a statistical transformation policy. The statistical transformation policy may be not to perform any statistical transformations, thereby making this an optional step. Better results may be achieved through statistical transformation. Exemplary transformations include: (1) adjusting a raw term frequency by the sum of the term frequencies of the document, thus obtaining a relative frequency of occurrence (for example, see FIG. 16); (2) applying a transformation to the data (e.g. taking the arcsin of the square root of the relative frequencies) to stabilize the variance of the sampling frequencies, thereby making words with radically different frequencies more comparable; and (3) centering the data around the origin by subtracting the row average from each term frequency (for example, see FIG. 17). Obtaining a relative frequency, and stabilizing the variance of the sampling frequencies make the term frequencies more comparable to each other from one document to the other, while centering the data makes the interpretation of the data statistically more meaningful. Obtaining a relative frequency, and stabilizing the variance of the sampling frequencies themselves do not change the sparsity of the matrix. However, centering the data does destroy the sparsity of A which should be avoided for computational reasons. Centering the data around the origin can be accomplished by a performing rank-one modification of the transformed frequency matrix A using the Equation 1 and Equation 2 as follows:

$$A_{cen} = A - me^t \quad (1)$$

where the ith component of m is the average of the ith row of A and all of the components of e are 1. Then $$A_{cen}x = A x - m\xi \quad (2)$$

where $\xi$ is the sum of components of x.

The dense matrix vector multiplication required by the two-sided orthogonal subspace computation is replaced by one sparse matrix multiplication, one vector scaling, and one vector subtraction. Thus, the explicit computation of the centering can be avoided and the sparsity of the uncentered A can be exploited while gaining the advantage of centering the data. Henceforth, A will refer to the centered matrix $A_{cen}$. The initial statistical transformation policy, i.e., block 152, is the same policy used for updating as discussed later with reference to block 162 of FIG. 6 and block 222 of FIG. 9.

Next, the logic of FIG. 5 moves to block 154 where a two-sided orthogonal subspace computation is performed. Preferably, the two-sided orthogonal subspace computation performed is a truncated URV (TURV) decomposition used to reduce the dimensionality of A and expose the latent semantic structure of the document collection. The decomposition results in three matrices: a term basis matrix, a weight matrix and a document basis matrix. The term basis matrix and the document basis matrix both have orthonormal columns and the weight matrix is an upper triangular matrix. If A is used directly for text mining, several problems are encountered. First, there are significant computational challenges based on the typical size of A. Additionally, difficulties are encountered in discerning patterns in the data. Further, there is not a satisfactory way to visualize the broad semantic relations among the documents. Therefore, there is a need for a principled way to reduce the number of variables. The TURV decomposition provides a means of projecting the data into a much lower dimensional subspace that captures the essential patterns of relatedness among the documents. Statistically, the effect of the TURV is to combine the original large set of variables into a smaller set of more semantically significant features. The coordinates of the projected data in the reduced number of dimensions can be used to characterize the documents, and therefore represent the effect of thousands or tens of thousands of terms in a few hundred or more significant features.

As a result of the properties of the TURV, the resultant subspace will capture the latent semantic structure of the original matrix A, removing the differences that accrue from the user's variability in word choice to describe the same ideas, thus enhancing the ability to perceive the semantic patterns in the data.

The "U" and "V" in TURV are the standard denotations of the orthonormal bases of the original matrix A. "R" is the standard denotation for an upper triangular matrix. The TURV decomposition of matrix A has the form:

$$A = URV^T \quad (3)$$

where U and V have orthogonal columns and, R is upper triangular and of the form:

$$\begin{bmatrix} R_{11} & R_{12} \\ O & R_{22} \end{bmatrix} \quad \text{where} \quad (4)$$

$$\begin{bmatrix} R_{12} \\ R_{22} \end{bmatrix} \quad (5)$$

is considered to be small in norm. "Smallness" is largely dependent on what is considered to be "noise" for the particular application, as explained below. The TURV decomposition corresponds to choosing $R_{11}$ to be of dimension c (the cutoff) and treating the $R_{12}$ and $R_{22}$ blocks as if they were 0, i.e., ignoring them. Producing a complete URV decomposition of A would require choosing c=rank(A). For text mining applications, it is desirable to produce a subspace that contains only the significant features of A. For example, we could use rank-revealing techniques to ensure that $R_{11}$ contains the c most semantically interesting features of A. The parameter c provides a stopping point for the decomposition algorithm, generating an approximation $A_c$ to A:

$$A \approx A_c = U_c R_c V_c^T \quad (6)$$

where $R_c$ is of the order c and $U_c$ and $V_c$ consist of c orthogonal columns of length t (number of terms) and d (number of documents), respectively. The cutoff parameter c can be more clearly understood by looking at an analogy based on the concept of signal-to-noise in signal processing. In general, the statistical information in A's full rank (rank (A)) includes a significant amount of noise that corresponds to variations in the choice of vocabulary used by authors across documents with a similar semantic content. For text mining, it is desirable to find the major semantic distinctions between documents, i.e., the "signal," in the statistical information stored in A. $A_c$ is a rank-c approximation of A. The information in A is projected into a c-dimensional subspace, in an attempt to identify the latent semantic signal in a manner suitable for text mining operations. In the TURV decomposition of Equation 6, the columns of $U_c$ provide an orthogonal basis for a c-dimensional subspace U of the full term space. U preserves most of the term information in A, in the sense that the major document distinctions based on the relative occurrences of terms in the collection will remain in $U_c$. Projecting each column (document) of A into U provides a new matrix $U_c^T A$ of reduced term dimension. $U_c^T$ can be viewed as reducing the norm in the full term space to a semi-norm that attaches importance to the separation of documents in certain directions and disregards their separation in other directions. The difficulty is selecting these directions, which is provided by the TURV decomposition. Similarly, the columns of $V_c$ provide an orthogonal basis for a c-dimensional subspace V of the full document space. V preserves most of the document signal in A in the sense that major distinctions between terms based on their relative appearance across the document collection will remain in $V_c$. Therefore, $V_c$ functions as a map that projects each row of A down to V, and this projection can be viewed as reducing the norm in the full document space to a semi-norm that favors the separation of terms in certain directions and ignores their separation in other directions. Again, the TURV decomposition determines this reduction.

Other decompositions can be used. For example, a ULV decomposition which is similar to a URV decomposition except that instead of generating an upper triangular matrix, i.e., "R," as the second matrix, a lower triangular matrix, i.e., "L," is generated. The logic of FIG. 5 then ends and processing returns to FIG. 3.

Figure 6:
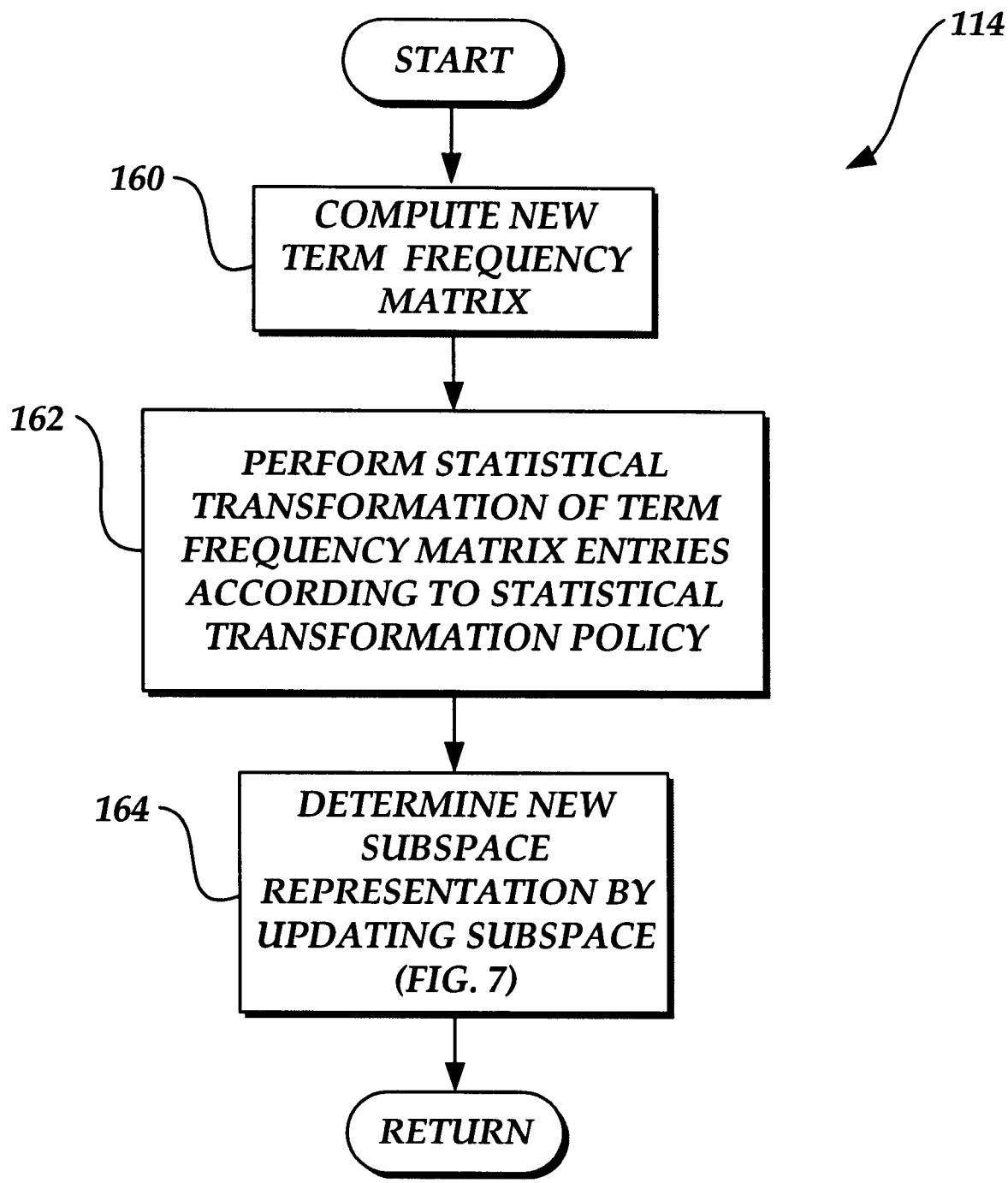
FIG. 6 is a flow diagram illustrating logic for performing update indexing.

When new documents are added to the document collection, update indexing is performed, as illustrated in FIG. 6. The logic of FIG. 6 moves from a start block to block 160 where a term frequency matrix for the new documents is computed. Next, in block 162 a statistical transformation of the matrix entries is performed according to the statistical transformation policy (see block 152, FIG. 5). Still referring to FIG. 6, the logic then moves to block 164 where a new subspace representation is determined by updating the existing subspace with new documents and terms, as illustrated in detail in FIG. 7, and described next. The logic of FIG. 6 then ends and processing is returned to FIG. 3.

Figure 7:
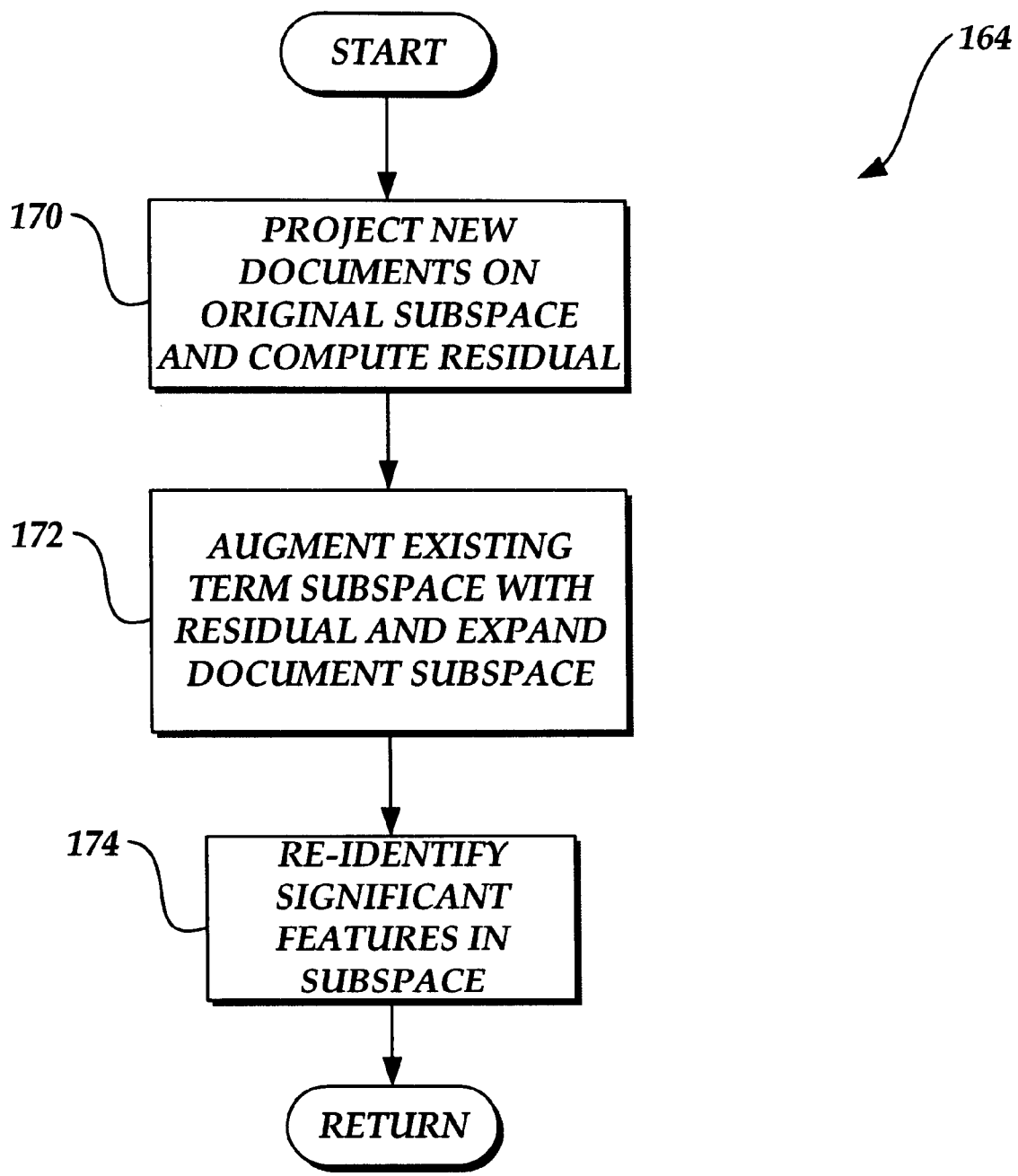
FIG. 7 is a flow diagram for determining a new subspace representation by updating an existing subspace with new documents and terms.

The logic of FIG. 7 of determining a new subspace representation by updating the existing subspace with new documents and terms moves from a start block to block 170 where new documents are projected on the original subspace and the residual is computed. Next, in block 172, the existing term subspace, $U_c$, is augmented with the normalized residual, which is orthogonal to the original term subspace, and the document subspace, $V_c$, is expanded by adding a small identity matrix accordingly. The logic then moves to block 174 where the c most significant features in the subspace are re-identified, again, for example, by rank-revealing techniques. The logic of FIG. 7 then ends and processing returns to FIG. 3.

Figure 8A:
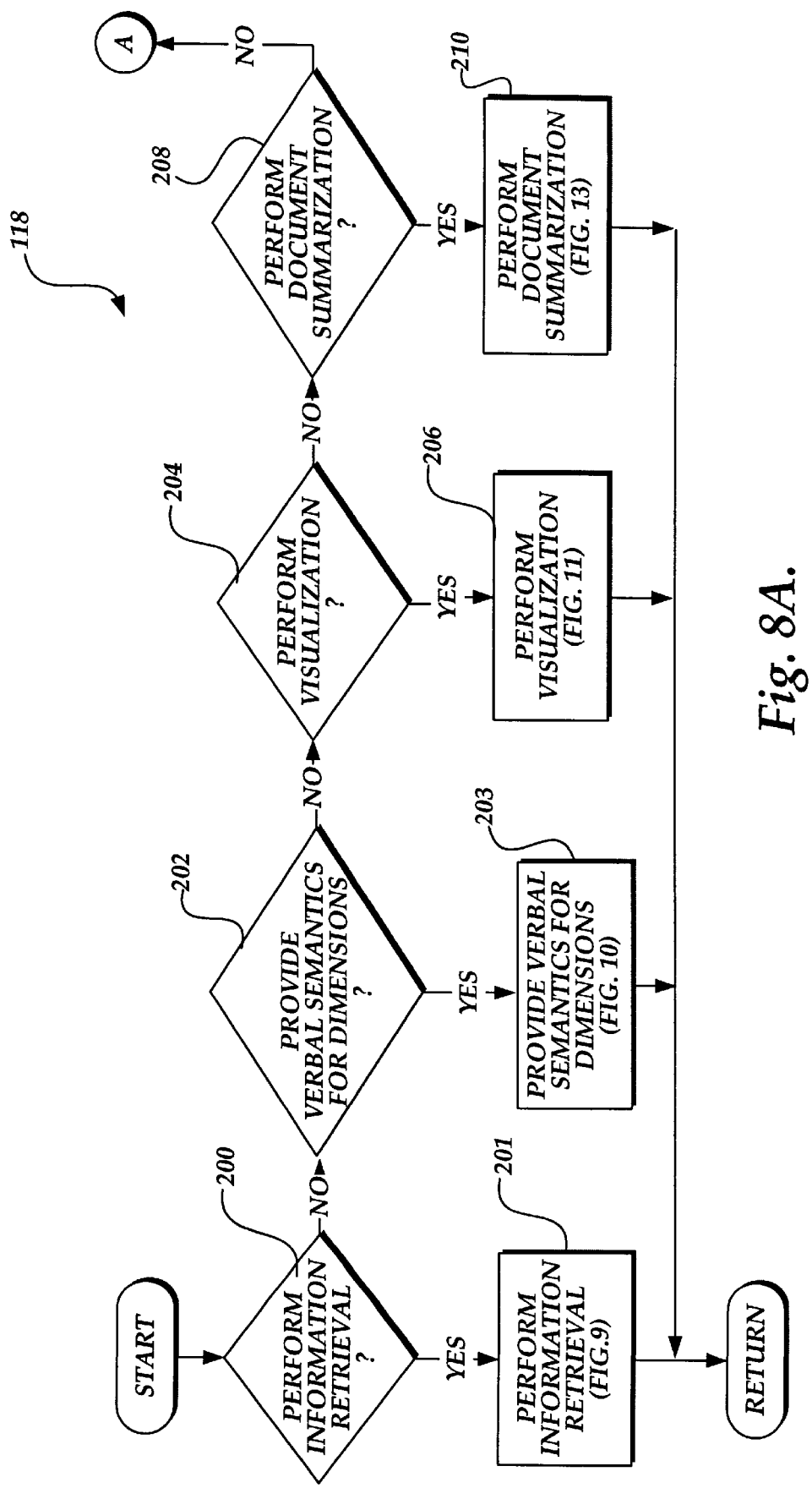
FIGS. 8A and 8B are a flow diagram illustrating the logic of performing text mining operations.
Figure 8B:
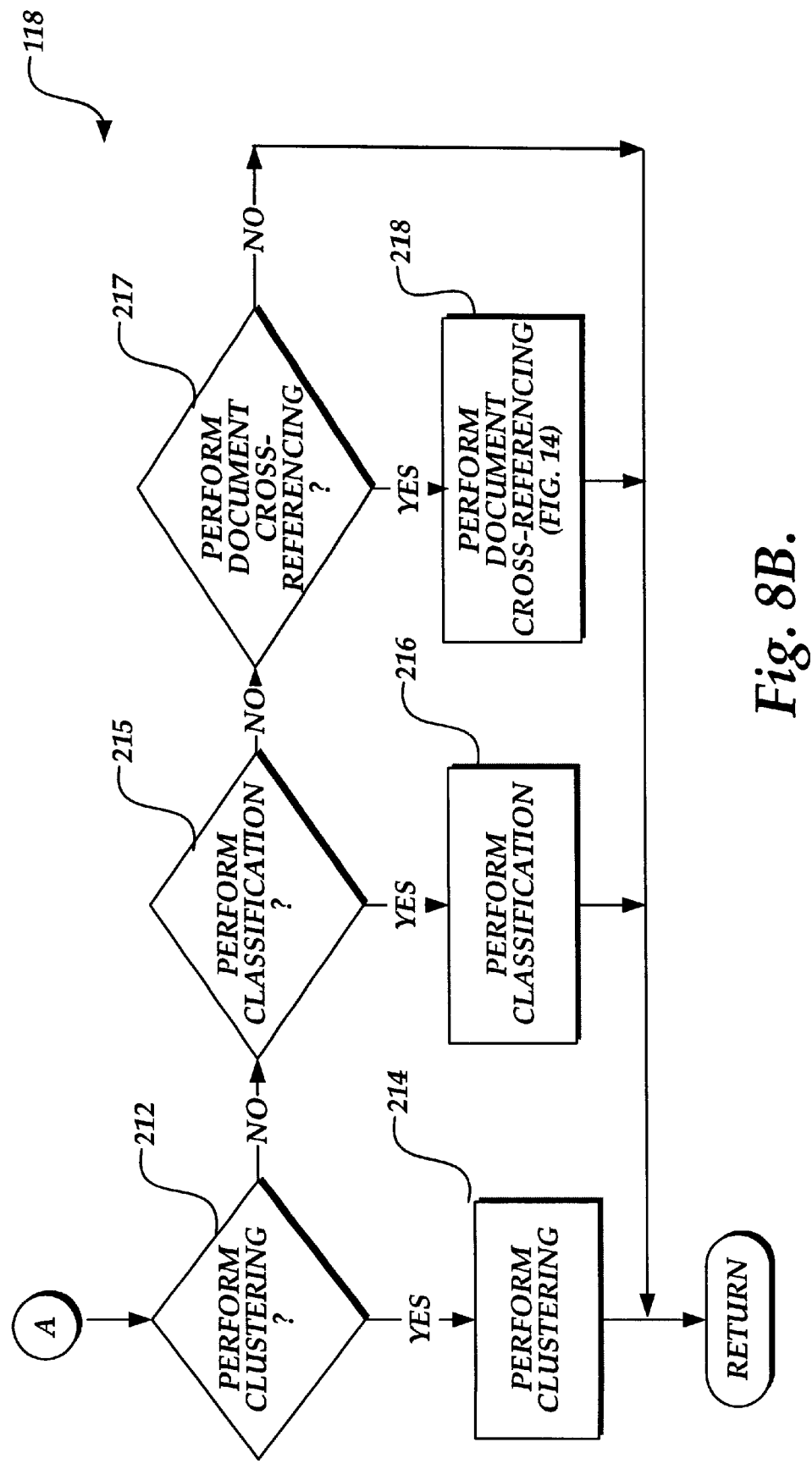

FIGS. 8A and 8B are a flow diagram illustrating the logic of performing a text mining operation. Preferably, the determination of which text mining operation to perform, if any, is determined by a user via a suitable user interface. The logic of FIG. 8A moves from a start block to decision block 200 where a test is made to determine if information retrieval should be performed. If so, the logic moves to block 201 where information retrieval is performed, as illustrated in detail in FIG. 9.

Figure 9:
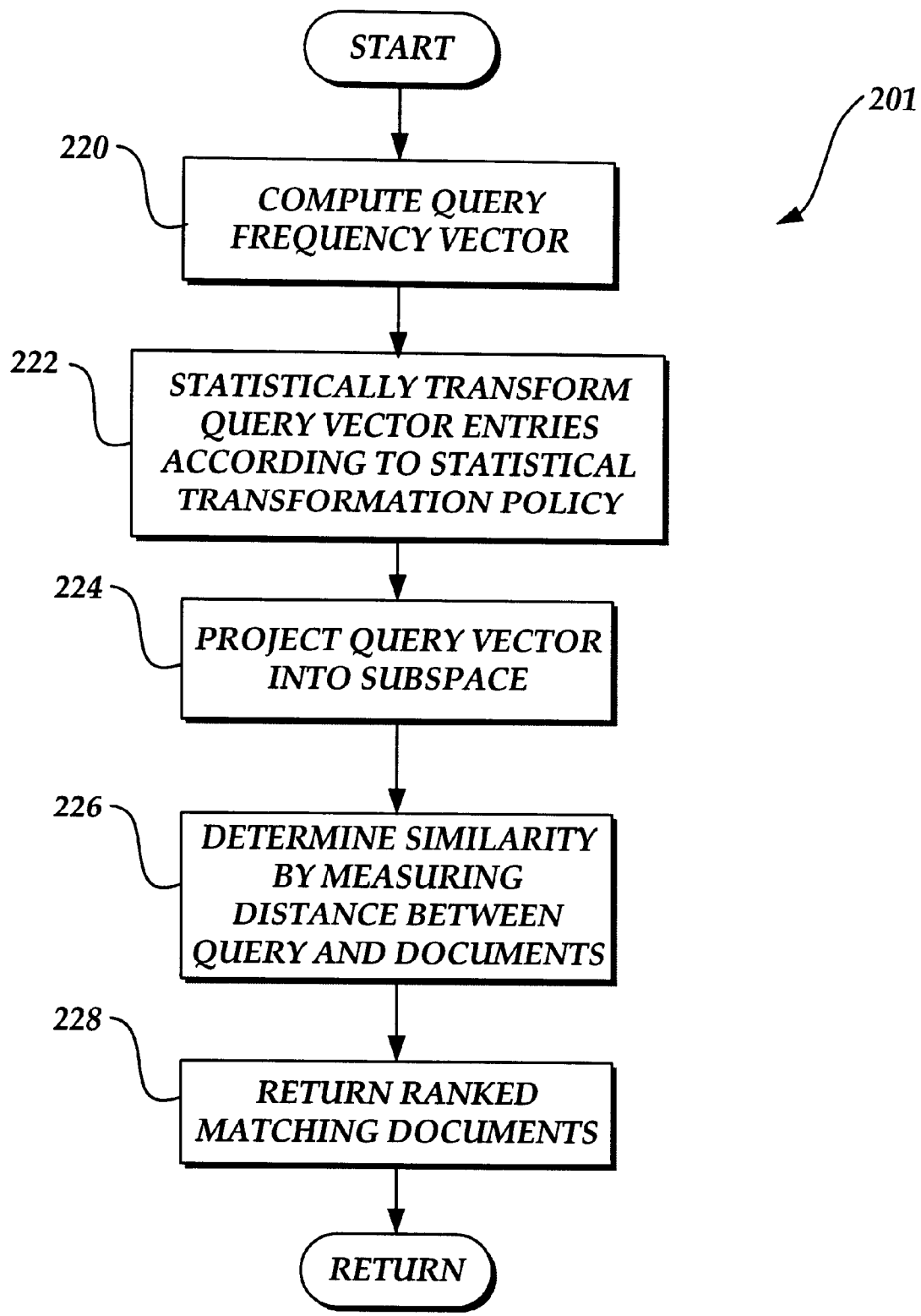
FIG. 9 is a flow diagram illustrating the logic of performing an information retrieval operation.

FIG. 9 illustrates the logic of information retrieval. As with existing latent semantic indexing methods, once the document collection is represented in the subspace, a query can be treated as a document, and projected into the same subspace. The distances between the query and other documents are measured (e.g., using the cosine measure) to determine the best matches (i.e., the nearest documents), as is described in detail in connection with FIG. 9. The logic of FIG. 9 moves from a start block to block 220 where a query frequency vector is computed by tokenizing the query and applying the same term normalization and stemming policies that were used on the original collection (see FIG. 4, blocks 138 and 142, respectively). The resulting terms that occurred in the original document collection are then counted. The logic then moves to block 222 where the query vector entries are statistically transformed using the same policy that was used on the original term frequency matrix (see FIG. 5, block 152). Next, in block 224 the query vector is projected into the subspace. The logic then moves to block 226 where the similarity is determined by measuring the distance between the query and the documents, for example, by using the cosine. The top ranked documents (in terms of closeness) are then returned as best matches to the query. See block 228. The logic of FIG. 9 then ends and processing returns to FIG. 8A.

Returning to FIG. 8A, if information retrieval is not to be performed, the logic moves to decision block 202 where a test is made to determine if verbal semantics should be provided for dimensions. If so, the logic moves to block 203 where verbal semantics are provided for dimensions, as illustrated in detail in FIG. 10.

Figure 10:
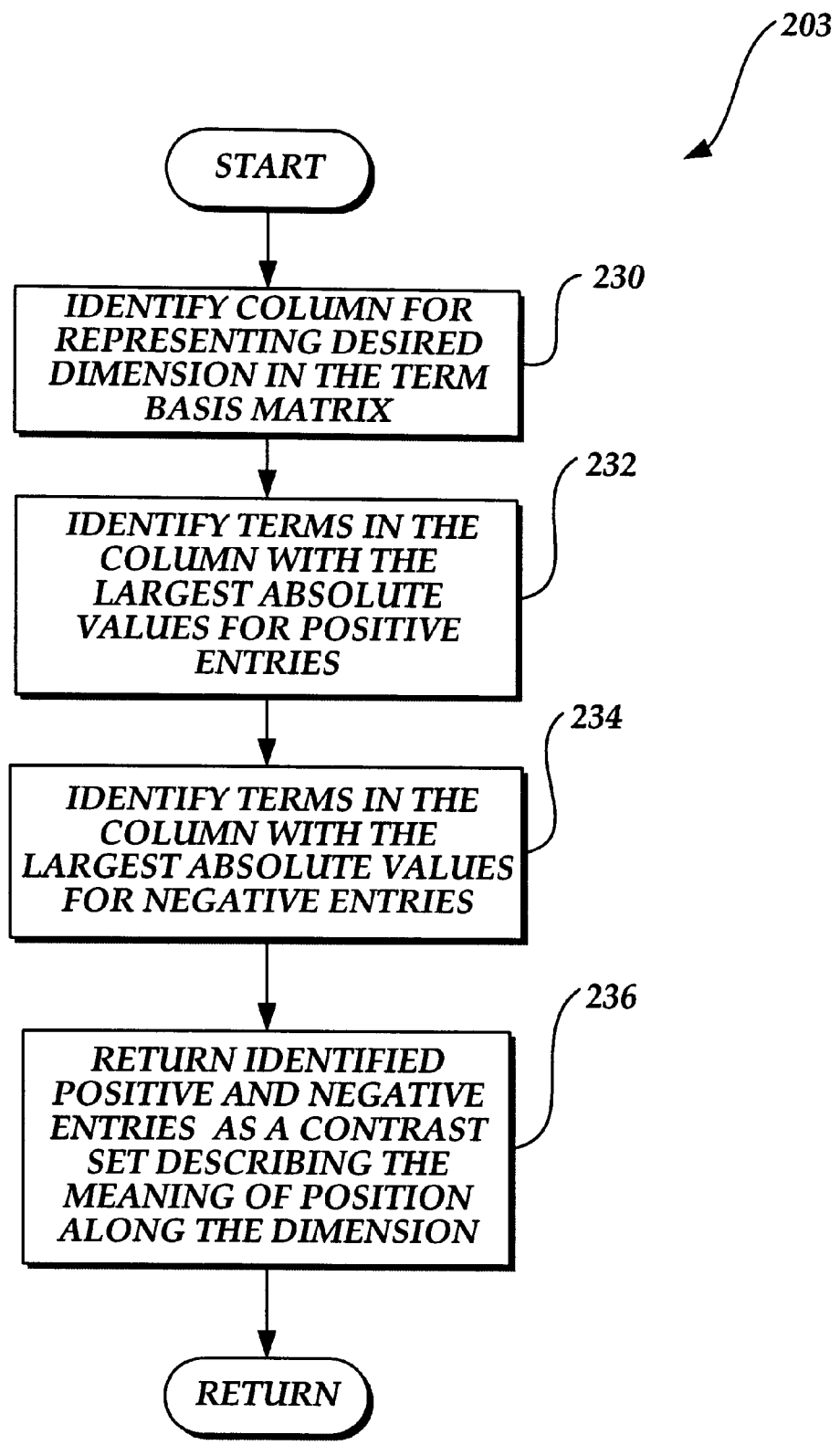
FIG. 10 is a flow diagram illustrating the logic of providing verbal semantics for dimensions.

The logic of FIG. 10 moves from a start block to block 230 where a column for representing a desired dimension is identified in the term basis matrix. Next, in block 232 terms are identified in the column with the largest absolute values for positive entries. The logic then moves to block 234 where terms are identified in the column with the largest absolute values for negative entries. Next, in block 236, the identified positive entries and the identified negative entries are returned as a contrast set describing the meaning of position along the dimension. The logic of FIG. 10 then ends, and processing returns to FIG. 8A.

Returning to FIG. 8A, if verbal semantics for dimensions are not to be provided, the logic moves to decision block 204 where a test is made to determine if visualization should be performed. If so, the logic moves to block 206 where visualization is performed, as illustrated in detail in FIG. 11.

Figure 11:
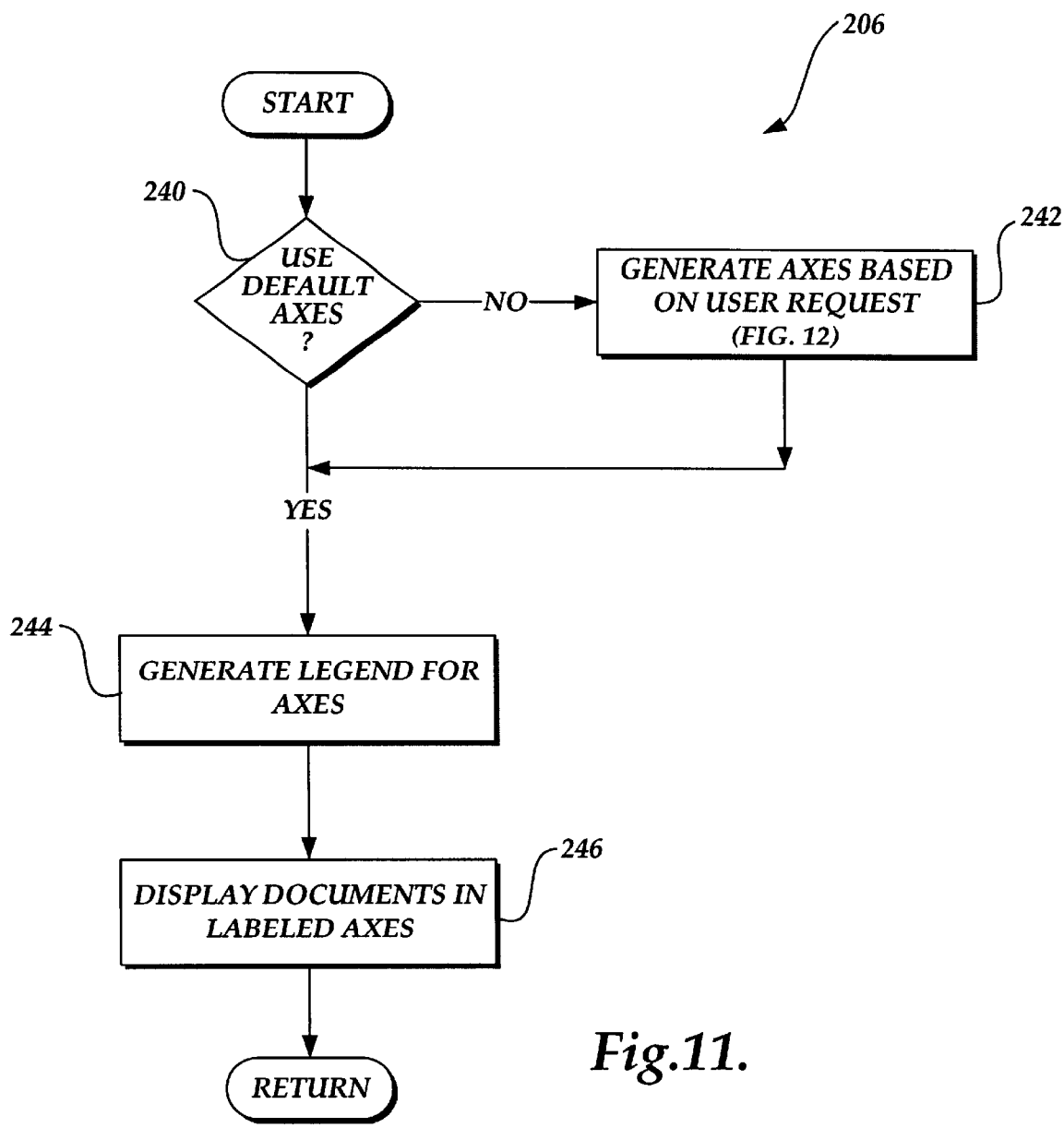
FIG. 11 is a flow diagram illustrating the logic of performing a visualization operation.

FIG. 11 is a flow diagram illustrating the logic performing visualization. FIG. 20, described later, illustrates an example of information visualization. The user can visualize either documents in reduced term space or terms in reduced document space. The former is discussed below, and the latter is completely analogous. The goal of visualization is to present the data in a way that allows a user to rapidly recognize certain types of semantic relationships in the data. This is generally accomplished using a two-dimensional or three-dimensional representation that exposes selected types of semantic patterns. Often, a user will not know in advance what the semantic relationships are, but would like to specify them dynamically. As discussed earlier, the TURV decomposition is used to project the documents from a high dimensional subspace into a lower dimensional subspace U. Following the same principles, the original documents can be projected into a three-dimensional space in which the basis vectors can be generated to correspond to sets of user-supplied terms. The logic of FIG. 11 moves from a start block to decision block 240 where a test is made to determine whether default axes will be used. While a user's choice for axes provides the most flexible way to visualize the subspace generated by TURV, it is also possible to create a three-dimensional scatterplot visualization without user input. This would be useful if, for example, the user was not familiar with the document set, and so is unable to provide useful terms for generating a scatterplot. If default axes are not to be used, the logic moves to block 242 where axes are generated based on a user request. The logic of generating axes based on a user request is illustrated in detail in FIG. 12.

Figure 12:
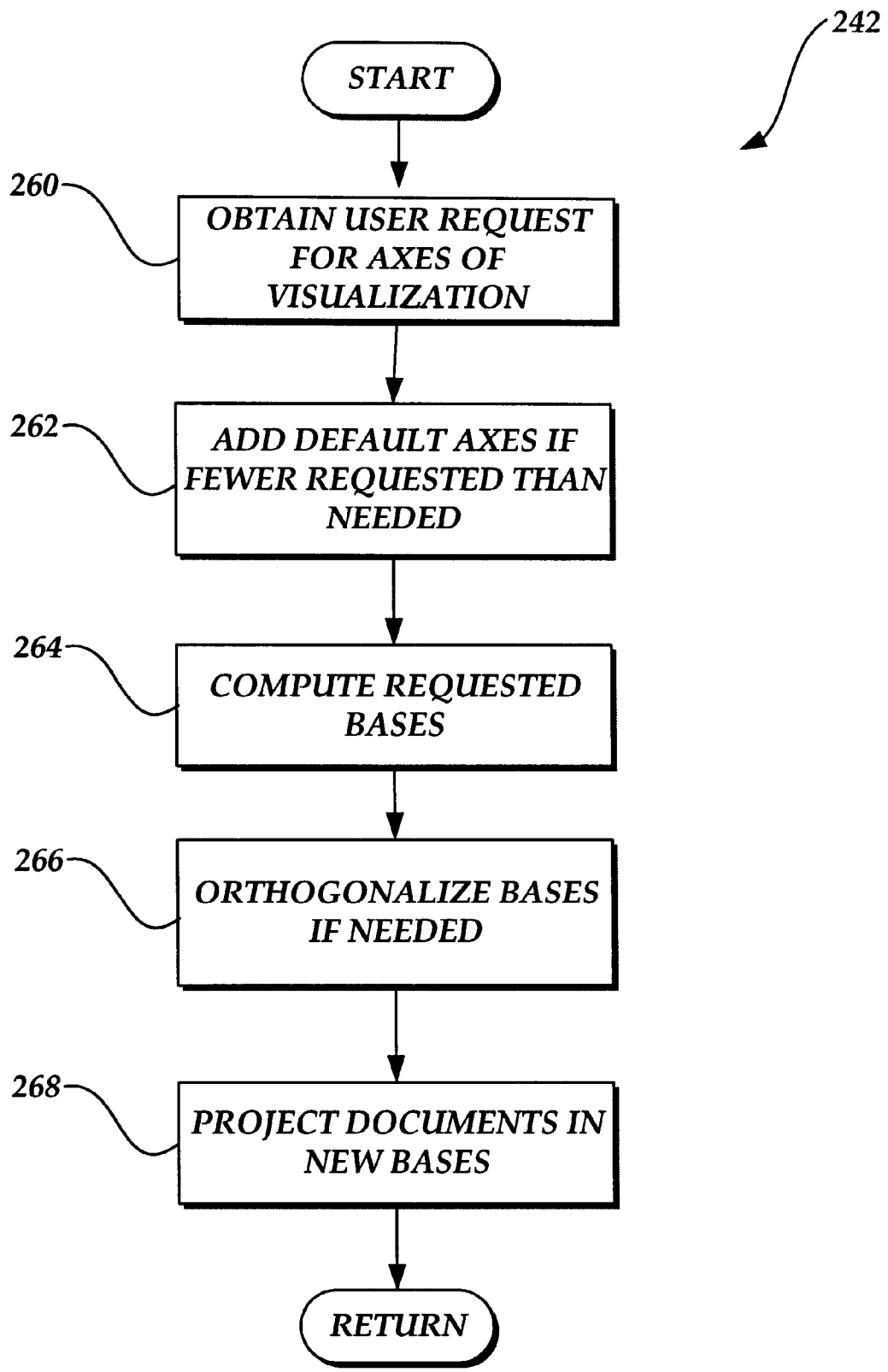
FIG. 12 is a flow diagram illustrating the logic of generating axes based on a user request.

The logic of FIG. 12 of generating axes based on a user request moves from a start block to block 260 where the user request is obtained. In the simplest case, a single term is specified for each axis, in which case the corresponding term vector will have a 1 at the index of that term and a 0 everywhere else. Potentially, a term vector (as denoted by $q_1$, $q_2$, and $q_3$ in Equation 7 below could specify a weighted set of terms instead of a single term. A user interface could be provided to make it easy for the user to select terms. Next, in block 262, the user request is completed, i.e., filled out with default axes, if there are fewer than the number to be used, for example, three. The logic then moves to block 264 where requested bases are computed using Equation 7 as follows:

$$W = U_c^T [q_1 q_2 q_3] \quad (7)$$

where the columns of W are projections of the requested axes into the subspace U.

Next, in block 266, if desired, the bases are orthogonalized to $\tilde{W}$, e.g., using QR-decomposition or SVD). The documents are then projected in the new bases. See block 268. Specifically, D is a 3×d matrix (where d is the number of documents) whose kth column is the three coordinates in three-dimensional space used to plot the kth document as in Equation 8:

$$D = \tilde{W}^T U_c^T A \quad (8)$$

where the columns of $U_c \tilde{W}$ constitute the basis vectors of the space used for visualization. If a visualization technique can handle more than three dimensions, as many dimensions as are needed can be supplied. The logic of FIG. 12 then ends and processing returns to FIG. 11.

Returning to FIG. 11, after the axes are obtained, either by default or based on user request, the logic moves to block 244 where a legend is generated for the axes. The legend consists of one or more words attached to one or both directions of the dimension. This indicates to the user that documents near one end of the dimension tend to contain the words at that end or words correlated with those words in the document set. The legend is obtained by identifying a column in the term frequency matrix that represents a desired dimension, identifying a plurality of terms in the column with the largest absolute values for positive entries, identifying a plurality of terms in the column with the largest absolute values for negative entries, returning the terms with the identified positive entries and the terms with the identified negative to describe the two directions along the dimension.

The documents are then displayed in the labeled axes in block 246. The logic of FIG. 11 of performing visualization then ends and processing returns to FIG. 8A.

Returning to FIG. 8A, if visualization is not to be performed, the logic moves to decision block 208 where a test is made to determine if document summarization should be performed. If so, document summarization is performed in block 210, as illustrated in detail in FIG. 13.

Figure 13:
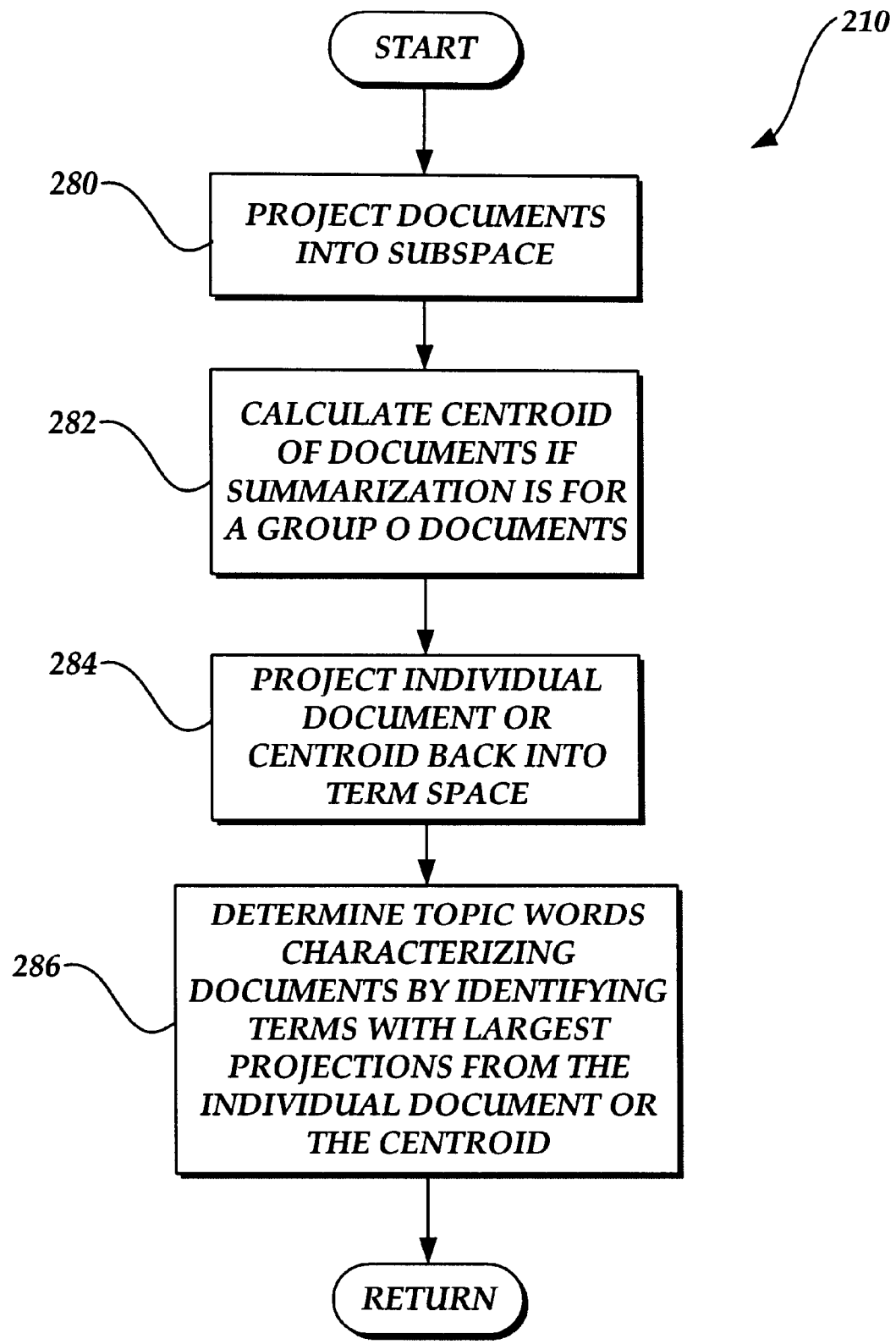
FIG. 13 is a flow diagram illustrating the logic of performing a document summarization operation.

FIG. 13 illustrates the logic of performing document summarization. Either an individual document or a group of documents can be summarized. The logic moves from a start block to block 280 where documents are projected into a subspace. If a group of documents is summarized, the centroid of the documents is then calculated in block 282. Next, in block 284 either the individual document or the centroid of the group of documents is projected back into a term space by left multiplying by $U_c$. The logic then moves to block 286 where topic words characterizing documents are determined by identifying terms with the largest projections from the individual document or the centroid. The logic of FIG. 13 then ends and processing returns to FIG. 8A.

Referring to FIG. 8A, if document summarization is not to be performed, the logic moves to block 212 (FIG. 8B) where a test is made to determine if clustering is to be performed. If so, the logic moves to block 214 where clustering is performed.

FIG. 21, described later, is an exemplary illustration showing some results achieved by applying a clustering algorithm to the subspace representation of the invention. Clustering is known in the art. The present invention applies known clustering logic to the subspace projection of the present invention. It is often useful to perform document summarization on the resulting document clusters.

If clustering is not to be performed, the logic of FIG. 8B moves from decision block 212 to decision block 215 where a test is made to determine if classification should be performed. If so, the logic moves to block 216 where classification is performed.

Classification can be either term classification or document classification. The logic of performing classification is analogous to clustering. Like clustering, a number of algorithms for classification are known in the art, such as CART (Classification and Regression Trees) or k-nearest neighbors. The present invention applies known classification logic to the subspace projection of the invention. Classification algorithms are first trained on a training set of already classified data items to classify the data according to some set of features of the data. In document classification with the invention, those features are the coordinates of the document in the term subspace. In term classification with the invention, those features are the coordinates of the term in the document subspace. The advantages of using these features are: 1) they are few, so classification algorithms, which tend to be expensive in time and space, can operate in a reasonable time; and 2) they better represent the topical similarity of the documents or terms and thus lead to a better classification. In general, it is often desirable to provide the verbal semantics for the features (i.e., the dimensions in term or document subspace), so that the analyst will understand what features are important for the classification. Without the ability to provide verbal semantics, the features are meaningless numbers, and the classification will lose value for the analyst.

Still referring to FIG. 8B, if it is determined that classification is not to be performed, the logic moves to decision block 217 where a test is made to determine if document cross-referencing should be performed. If so, the logic moves to block 218 where document cross-referencing is performed. The logic of performing document cross-referencing is illustrated in detail in FIG. 14.

Figure 14:
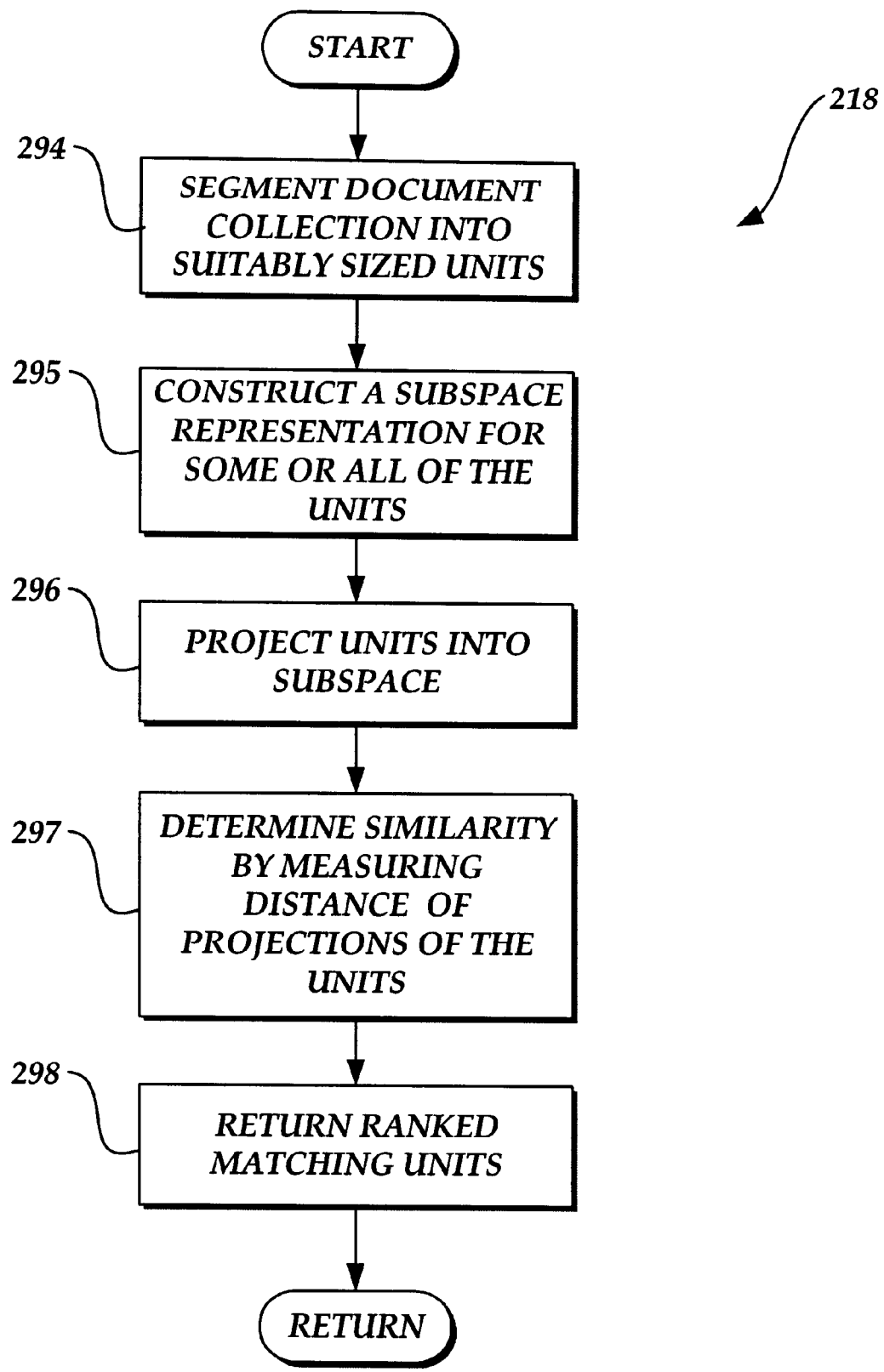
FIG. 14 is a flow diagram illustrating the logic of performing document cross-referencing.

The logic of performing document cross-referencing as shown in FIG. 14 moves from a start block to block 294 where the document collection is segmented into suitably sized units. A unit may be a paragraph or a section in a document. Ideally each unit should describe a single coherent topic. Next, in block 295, a subspace representation is constructed for some or all of the units. The units are then projected into the subspace, in block 296. Next, in block 297, the similarity is determined by measuring the distance between the projection of the units. Finally, in block 298, ranked matching units are returned. The logic of FIG. 14 then ends and processing returns to FIG. 8B.

Returning to FIG. 8B, after performing the appropriate text mining operation, or if no text mining operation is performed, for example, by a user pressing cancel, the logic of FIGS. 8A and 8B ends and processing returns to FIG. 3. It will be appreciated that the logic performed in FIGS. 8A and 8B can be performed in a different order and many steps can be performed simultaneously.

FIGS. 15–18 are drawings illustrating the mathematical underpinnings of the invention. FIG. 15 is a pictorial representation of a term frequency matrix. Each column represents a document in a document collection. Each row represents a term found in one or more of the documents. For each row/column entry, the raw number of occurrences of the term for the given row for the document is displayed. Alternatively, the matrix can be formed with columns representing the terms and rows representing the documents, with subsequent operations modified accordingly. To the right of the table is the query vector. At the bottom of each column is the score for the query vector. FIG. 15 illustrates the results of a query for the term "Apache." For this query, only Document A 302, Document C 304, and Document E 306 have non-zero scores,. Therefore, only these three documents are returned, although Document B 303 should also be returned because it contains "AH-64", which is a synonym for "Apache."

FIG. 16 illustrates proportioning of the document collection illustrated in FIG. 15. Proportioning provides a relative value as opposed to a raw value for the number of occurrences. For any given document the sum of the values for each entry adds up to 1. The result set is the same as based on the raw frequency as shown in FIG. 15, namely, Document A 302, Document C 304, and Document E 306, are returned for a query of "Apache" 300.

FIG. 17 illustrates centering of the document set shown in FIG. 15. Again, the same document set is returned as with the raw frequency (FIG. 15) and the proportioned frequency (FIG. 16), namely, Document A 302, Document C 304, and Document E 306 are returned for a query of "Apache" 300.

FIG. 18 illustrates distances and ranks using the present invention on the document set illustrated in FIG. 15. As shown in FIG. 18, in addition to the document set returned in the previous figures, i.e., Document A 302, Document C 304 and Document E 306, Document B 303 is also returned because it has a relatively large score. This is because, while "Apache" does not occur in Document B 303, both "AH-64" 310 and "rotorcraft" 312 occur in it, and they tend to be highly correlated with "Apache" 300 in the other documents in this set.

Figure 19:
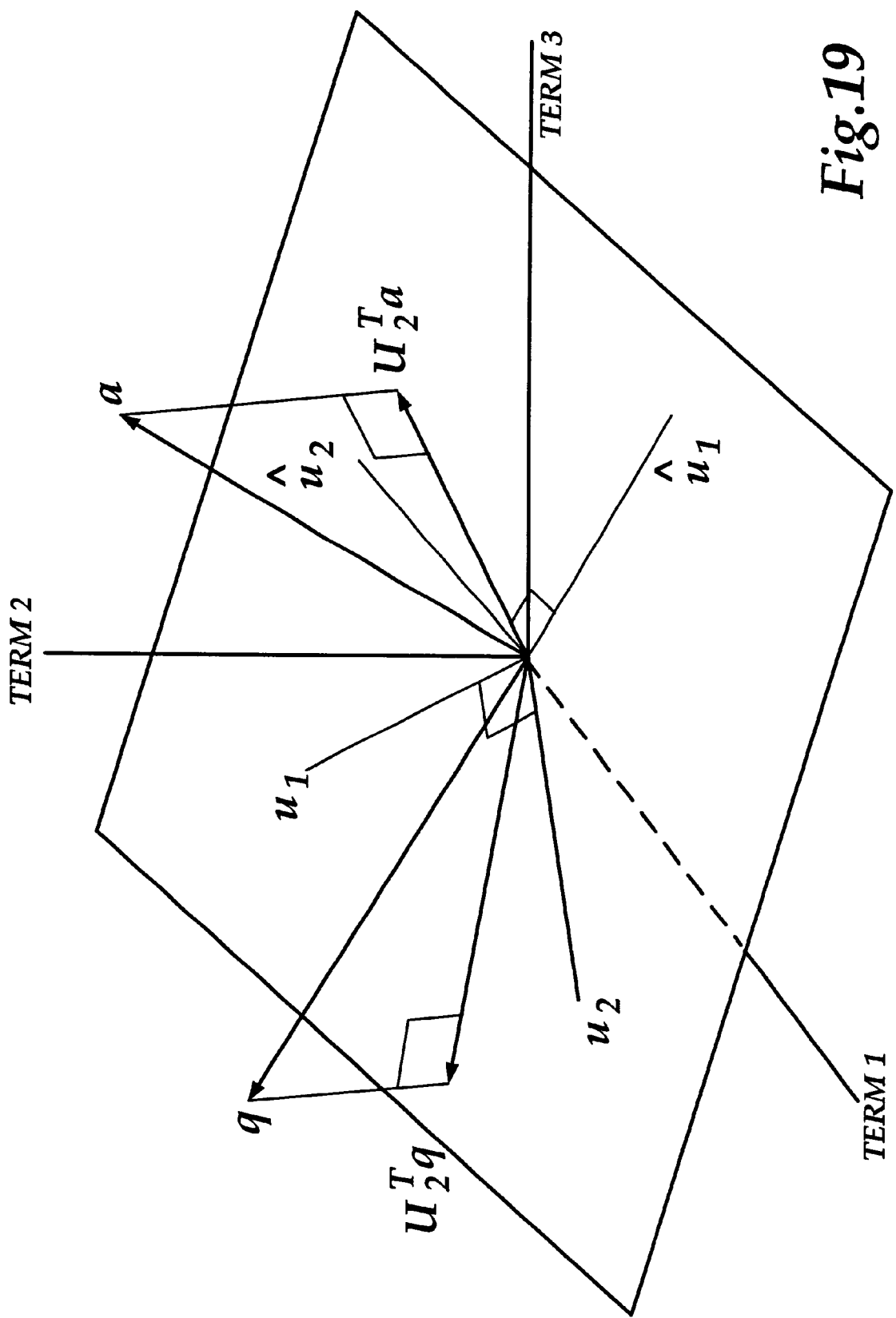
FIG. 19 is a pictorial representation of a two-dimensional subspace of a three-dimensional parent space formed in accordance with the present invention.

FIG. 19 illustrates the importance of the subspace concept. Text mining applications are interested in the topic similarity between two documents or between a query and a document. This translates into the distance between the projection of the query ($\hat{q}$) and the document ($\hat{a}$) in the subspace (illustrated in FIG. 19 as the projections of q and a in three-dimensional space into $\hat{q}$ and $\hat{a}$ in two-dimensional space). While traditional latent semantic indexing emphasizes using the principal components as basis vectors $u_1$ and $u_2$, it is really only the subspace that is important. Any set of basis vectors that spans that subspace will do, for example $\hat{u}_1$ and $\hat{u}_2$, can be used. Thus allowing for exploration of other decompositions that may have advantages over SVD.

FIG. 20 illustrates an example of a scatterplot diagram. For example, if the document collection consisted of aviation-related documents, and a user decided to create a three-dimensional scatterplot visualization of a selected topic distribution in the document set, the user would be prompted to enter a term or set of terms for each axis to be used to construct the scatterplot. Assuming the user entered "module," "fuselage," and "pounds" as choices for the positive direction of the axes, D would be constructed. If D were not orthogonal, the axes would be reorthogonalized. Because documents discussing fuselage and weight using the word "pounds" are likely to be highly correlated, the corresponding axes will not be orthogonal. Reorthogonalizing can be done via a decomposition such as QR-decomposition or SVD. Alternatively, the actual D matrix can be used for visualization with an indication that it is not orthogonal, for example, by displaying the axes as dotted lines rather than as solid lines.

FIG. 21 illustrates an example of some results achieved by applying a clustering algorithm to the subspace representation of the present invention. The illustrated example uses sample text of web pages from a company intranet, and then performs document group summarization on each cluster.

While the preferred embodiment of the invention has been illustrated and described, it will be appreciated that various changes can be made therein without departing from the spirit and scope of the invention as defined by the appended claims.

What is claimed is:

1. A method of representing a document collection, wherein the document collection comprises a plurality of documents, with each document comprising a plurality of terms, using a:subspace projection based on a distribution of the frequency of occurrences of each of the terms in each of the documents, the method comprising:

(a) constructing a term frequency matrix, wherein each entry of the term frequency matrix is the frequency of occurrence of one of the terms in one of the documents;

(b) determining a statistical transformation policy;

(c) statistically transforming the entries of the term frequency matrix according to the statistical transformation policy;

(d) determining a projection type;

(e) determining a lower dimensional subspace; and (f) generating an original term subspace by projecting the projection type into the lower dimensional subspace.

2. The method of claim 1, wherein the projection type is the documents.

3. The method of claim 1, wherein the projection type is the terms.

4. The method of claim 1, wherein said statistically transforming entries of the term frequency matrix identifies a plurality of significant features, wherein the significant features are used to determine a term subspace and a document subspace, the method comprising:

(a) determining a document length, wherein the document length is the total number of term occurrences in the document;

(b) for each entry, determining a relative frequency of each term by dividing the raw frequency of each term by the document length;

(c) performing an operation on the relative term frequencies to make high frequencies and low frequency terms more comparable;

(d) determining a row average; and (e) centering data by subtracting the row average from each term frequency.

5. The method of claim 1, wherein said constructing of the term frequency matrix comprises defining the term frequency matrix, wherein each row represents a term occurring in one or more of the documents in the document collection, each column represents one of the documents in the document collection, and each entry in the term frequency matrix is the number of occurrences of the term represented by the row of the entry in the document represented by the column of the entry.

6. The method of claim 5, wherein said defining of the term frequency matrix comprises generating a term list.

7. The method of claim 6, wherein said generating a term list comprises:

(a) determining a policy for tokenizing terms;

(b) tokenizing a plurality of terms according to the tokenizing policy;

(c) determining a stopwords policy; and (d) removing stopwords from the terms represented by rows in the term frequency matrix according to the stopwords policy.

8. The method of claim 7, further comprising:

(a) determining a low frequency words policy; and (b) removing a plurality of low frequency words according to the low frequency words policy.

9. The method of claim 8, further comprising:

(a) determining an acronym expansion policy; and (b) performing acronym expansion according to the acronym expansion policy.

10. The method of claim 9, further comprising:

(a) determining an abbreviation expansion policy; and (b) performing abbreviation expansion according to the abbreviation expansion policy.

11. The method of claim 10, further comprising:

(a) determining a policy for other term normalizations; and (b) performing other term normalizations according to the other term normalization policy.

12. The method of claim 11, further comprising:

(a) determining a stemming policy; and (b) performing stemming according to the stemming policy.

13. The method of claim 12, wherein said projecting the projection type into the lower dimensional subspace comprises:

(a) determining a number of dimensions to use;

(b) performing a two-sided orthogonal decomposition of the term frequency matrix according to the determined dimension, the decomposition identifying significant features using three matrices: a term basis matrix, a weight matrix and a document basis matrix, wherein the term basis matrix and the document basis matrix both have orthonormal columns; and (c) projecting the projection type into the lower dimensional subspace using the results of the decomposition.

14. The method of claim 13, wherein the two-sided orthogonal decomposition is a truncated URV decomposition.

15. The method of claim 13, wherein the document collection is a dynamically changing document collection, and further comprising updating the original term subspace as the document collection changes.

16. The method of claim 15, wherein said updating the original term subspace comprises:

(a) identifying a plurality of new documents;

(b) identifying a plurality of new terms in the new documents;

(c) constructing a new term frequency matrix that represents the new documents;

(d) statistically transforming the entries of the new term frequency matrix according to the statistical transformation policy;

(e) projecting the new term frequency matrix on the original term subspace, the term basis matrix;

(f) computing a residual;

(g) augmenting the existing term subspace with the residual;

(h) expanding the original term subspace, wherein expanding the original term subspace comprises expanding the document basis matrix by adding a small identity matrix; and (i) re-identifying significant features in the subspace.

17. The method of claim 16, wherein said identifying a plurality of new terms comprises:

(a) tokenizing a plurality of terms according to the tokenizing policy;

(b) removing stopwords according to the stopwords policy;

(c) removing low frequency according to the low frequency words policy;

(d) performing acronym expansion according to the acronym expansion policy;

(e) performing abbreviation expansion according to the abbreviation expansion policy;

(f) performing other term normalization according to the other term normalization policy; and (g) performing stemming according to the stemming policy.

18. The method of claim 16, wherein said constructing the new term frequency matrix comprises defining the new term frequency matrix, wherein each row represents a term occurring in one or more of the documents, each column represents one of the documents, and each entry in the block consists of the number of occurrences of the term represented by the row of the entry in the document represented by the column of the entry.

19. The method of claim 12, further comprising performing a text mining operation, wherein performing the text mining operation is at least one of:

(a) providing verbal semantics for at least one dimension of the subspace;

(b) performing document summarization on an individual document;

(c) performing document summarization for a group of documents;

(d) performing information visualization;

(e) performing information retrieval;

(f) performing document cross-referencing;

(g) performing clustering on a clustering projection type; and (h) performing classification on a classification projection type.

20. The method of claim 19, wherein providing verbal semantics for the dimension comprises:

(a) identifying a column in the term basis matrix that represents a desired dimension;

(b) identifying a plurality of terms in the column with the largest absolute values for positive entries;

(c) identifying a plurality of terms in the column with the largest absolute values for negative entries; and (d) returning the identified positive entries and the identified negative entries as a contrast set describing the meaning of position along the dimension.

21. The method of claim 19, wherein performing document summarization on the individual document comprises:

(a) projecting the document into a subspace;

(b) projecting the document projection back into the term subspace;

(c) identifying a plurality of terms with the largest entries; and (d) returning the identified terms as a document summarization.

22. The method of claim 19, wherein performing document summarization for the group of documents comprises:

(a) projecting the group of document into a subspace;

(b) finding a centroid of the group of documents in the subspace;

(c) projecting the centroid back into the term subspace;

(d) identifying a plurality of terms with the largest entries; and (e) returning the identified terms as a summarization of the group of documents.

23. The method of claim 19, wherein performing information visualization comprises:

(a) in response to a user request for dimensions of visualization, determining a number of dimensions;

(b) computing the requested dimensions;

(c) determining whether the user has requested fewer than the determined number of dimensions;

(d) if the user has requested fewer than the determined number of dimensions, using a set of default dimensions;

(e) determining if the dimensions are orthogonalized;

(f) if the dimensions are not orthogonal, taking an appropriate action based on a user preference, wherein the user preference comprises one of:
  (i) orthogonalizing the dimensions; and
  (ii) providing an indication that the dimensions are not orthogonal;

(g) projecting the documents onto the dimensions;

(h) generating legends for the dimensions by providing verbal semantics for the dimensions; and (i) displaying a plurality of indicators, wherein each indicator represents a document, on a plurality of labeled axes corresponding to the dimensions.

24. The method of claim 19, wherein performing information retrieval comprises:

(a) in response to a user query, constructing a term frequency query vector;

(b) statistically transforming the term frequencies according to the statistical transformation policy;

(c) projecting the term frequency vector into a subspace;

(d) determining a similarity measurement between the user query and the each document in the document collection; and (e) returning a plurality of ranked matching documents based on the determined similarity measurements.

25. The method of claim 24, wherein said constructing of the term frequency query vector comprises:

(a) tokenizing the terms according to the tokenizing policy;

(b) removing stopwords according to the stopwords policy;

(c) removing low frequency words according to the low frequency words policy;

(d) performing acronym expansion according to the acronym expansion policy;

(e) performing abbreviation expansion according to the abbreviation expansion policy;

(f) performing other term normalizations according to the other term normalization policy;

(g) performing stemming according to the stemming policy;

(h) identifying the terms that are in the original term frequency matrix representing the original document collection; and (i) counting the frequency of the identified terms in the query.

26. The method of claim 19, wherein performing document cross-referencing comprises:

(a) segmenting one or more of the documents into a plurality of suitably sized text units;

(b) constructing a subspace representation for the text units from one or more subsets of the document;

(c) for the subspace representations of each of the text units in one or more documents, determining a similarity measurement between the text unit and the subspace representations of the text units in one or more target documents; and (d) returning a plurality of ranked matching text units based on the determined similarity measurement.

27. The method of claim 19, wherein performing clustering on the clustering projection type comprises:

(a) using a clustering algorithm;

(b) if the clustering projection type is the documents, clustering the documents according to the distance of their projections in the term subspace and (c) if the clustering projection type is the terms, clustering the terms according to the distance of their projections in the document subspace.

28. The method of claim 19, wherein performing classification on the classification projection type comprises:

(a) using a classification algorithm that accepts real valued features;

(b) if the classification projection type is the documents, using the coordinates of the projections of the documents in the term subspace as the features; and (c) if the classification projection type is the terms using the coordinates of the terms of the documents in the document subspace as the features.

29. A method of representing a document collection, wherein the document collection comprises a plurality of documents, with each document comprising a plurality of terms, using a subspace projection based on a distribution of the frequency of occurrences of each of the terms in each of the documents, the method comprising:

(a) constructing a term frequency matrix, wherein each entry of the term frequency matrix is the frequency of occurrence of one of the terms in one of the documents;

(b) determining a statistical transformation policy;

(c) statistically transforming the entries of the term frequency matrix according to the statistical transformation policy;

(d) determining a projection type;

(e) determining a lower dimensional subspace;

(f) generating an original term subspace by projecting the projection type into the lower dimensional subspace;

(g) if the document collection is a dynamically changing document collection, updating the original term subspace as the document collection changes; and (h) performing at least one text mining operation.

30. A computer readable medium having computer executable instructions for performing the method of:

(a) constructing a term frequency matrix, wherein each entry of the term frequency matrix is the frequency of occurrence of one of the terms in one of the documents;

(b) determining a statistical transformation policy;

(c) statistically transforming the term frequencies according to the statistical transformation policy;

(d) determining a projection type;

(e) determining a lower dimensional subspace; and (f) generating an original term subspace by projecting the projection type into the lower dimensional subspace.

31. A computer readable medium having computer executable instructions for performing the method of:

(a) constructing a term frequency matrix, wherein each entry of the term frequency matrix is the frequency of occurrence of one of the terms in one of the documents;

(b) determining a statistical transformation policy;

(c) statistically transforming the entries of the term frequency matrix according to the statistical transformation policy;

(d) determining a projection type;

(e) determining a lower dimensional subspace;

(f) generating an original term subspace by projecting the projection type into the lower dimensional subspace;

(g) if the document collection is a dynamically changing document collection, updating the original term subspace as the document collection changes; and (h) performing at least one text mining operation.

32. A system for representing a document collection using a subspace projection, comprising:

(a) a processing unit; and (b) a storage medium coupled to the processing unit, a storage medium storing program code implemented by the processing unit for:

(i) constructing a term frequency matrix, wherein each entry of the term frequency matrix is the frequency of occurrence of one of the terms in one of the documents;

(ii) determining a statistical transformation policy;

(iii) statistically transforming the term frequencies according to the statistical transformation policy;

(iv) determining a projection type;

(v) determining a lower dimensional subspace; and (vi) generating an original term subspace by projecting the projection type into the lower dimensional subspace.

33. A system for representing a document collection using a subspace projection, comprising:

(a) a processing unit; and (b) a storage medium coupled to the processing unit, a storage medium storing program code implemented by the processing unit for:

(i) constructing a term frequency matrix, wherein each entry of the term frequency matrix is the frequency of occurrence of one of the terms in one of the documents;

(ii) determining a statistical transformation policy;

(iii) statistically transforming the entries of the term frequency matrix according to the statistical transformation policy;

(iv) determining a projection type;

(v) determining a lower dimensional subspace;

(vi) generating an original term subspace by projecting the projection type into the lower dimensional subspace;

(vii) if the document collection is a dynamically changing document collection, updating the original term subspace as the document collection changes; and (viii) performing at least one text mining operation.

* * * * *

UNITED STATES PATENT AND TRADEMARK OFFICE
CERTIFICATE OF CORRECTION

PATENT NO. : 6,611,825 B1
DATED : August 26, 2003
INVENTOR(S) : D.D. Billheimer et al.

It is certified that error appears in the above-identified patent and that said Letters Patent is hereby corrected as shown below:

Column 19,
Line 5, "high frequencies and low frequency terms" should read -- high frequency and low frequency terms --

Column 20,
Line 36, after "low frequency" insert -- words --

Column 21
Line 29, "group of document" should read -- group of documents --

Column 22,
Line 3, "and the each document" should read -- and each document --

Signed and Sealed this

Ninth Day of November, 2004

JON W. DUDAS
*Director of the United States Patent and Trademark Office*